(12) United States Patent
Knobel et al.

(10) Patent No.: US 7,221,911 B2
(45) Date of Patent: May 22, 2007

(54) MULTI-BAND ULTRA-WIDE BAND COMMUNICATION METHOD AND SYSTEM

(75) Inventors: Yaron Knobel, Givat-Shmuel (IL); Gadi Shor, Tel-Aviv (IL); David Yaish, Tel-Aviv (IL); Sorin Goldenberg, Ness-Ziona (IL); Amir Krause, Ramat-Gen (IL); Erez Wienberger, Tel-Aviv (IL)

(73) Assignee: Wisair Ltd., Tel-Aviv (IL)

( * ) Notice: Subject to any disclaimer, the term of this patent is extended or adjusted under 35 U.S.C. 154(b) by 538 days.

(21) Appl. No.: 10/603,372

(22) Filed: Jun. 25, 2003

(65) Prior Publication Data
US 2004/0032354 A1 Feb. 19, 2004

Related U.S. Application Data

(63) Continuation-in-part of application No. 10/389,789, filed on Mar. 17, 2003.

(60) Provisional application No. 60/450,737, filed on Feb. 28, 2003, provisional application No. 60/404,070, filed on Aug. 16, 2002.

(51) Int. Cl.
*H04B 1/00* (2006.01)
*H04B 7/00* (2006.01)

(52) U.S. Cl. .............. 455/42; 455/44; 455/45; 455/502; 375/295; 375/354; 375/239; 375/130; 375/237; 370/347; 370/342; 370/498

(58) Field of Classification Search .......... 375/130, 375/354, 239, 362, 342, 350, 295; 370/347, 370/342, 498
See application file for complete search history.

(56) References Cited

U.S. PATENT DOCUMENTS

| | | | |
|---|---|---|---|
| 5,177,767 | A | 1/1993 | Kato |
| 5,206,881 | A | 4/1993 | Messenger et al. |
| 5,218,620 | A | 6/1993 | Mori et al. |
| 5,323,419 | A | 6/1994 | Mori et al. |
| 5,347,537 | A | 9/1994 | Mori et al. |
| 5,677,927 | A | 10/1997 | Fullerton et al. |
| 5,960,031 | A | 9/1999 | Fullerton et al. |
| 5,963,581 | A | 10/1999 | Fullerton et al. |
| 5,995,534 | A | 11/1999 | Fullerton et al. |

(Continued)

FOREIGN PATENT DOCUMENTS

EP 0889 600AS 1/1999

(Continued)

*Primary Examiner*—Marceau Milord
(74) *Attorney, Agent, or Firm*—Sonnenschein Nath & Rosenthal LLP

(57) ABSTRACT

The present invention provides ultra-wide band communication systems and methods, including multi-band ultra-wide band communication systems and methods. Methods and systems are provided in which frequency sub-bands of an ultra-wide band spectrum are allocated for signal transmission. An ultra-wide band transmission including the information is sent, including sending a signal over each of the plurality of sub-bands.

Methods are further provided in which a first data signal containing information is converted into an encoded signal using an Inverse Fast Fourier Transform. The encoded signal is converted into an encoded ultra-wide band signal that can be pulsed or transmitted using burst symbol cycles. The encoded pulsed ultra-wide band signal is decoded using a Fast Fourier Transform to obtain the information.

25 Claims, 20 Drawing Sheets

U.S. PATENT DOCUMENTS

| | | |
|---|---|---|
| 6,002,707 A | 12/1999 | Thue |
| 6,026,125 A | 2/2000 | Larrick, Jr. et al. |
| 6,031,862 A | 2/2000 | Fullerton et al. |
| 6,075,807 A | 6/2000 | Warren et al. |
| 6,351,652 B1 | 2/2002 | Finn et al. |
| 6,505,032 B1 * | 1/2003 | McCorkle et al. ......... 455/41.2 |
| 6,690,741 B1 * | 2/2004 | Larrick et al. ............. 375/295 |
| 6,735,238 B1 * | 5/2004 | McCorkle ................... 375/130 |
| 6,763,057 B1 * | 7/2004 | Fullerton et al. ........... 375/141 |
| 6,937,639 B2 * | 8/2005 | Pendergrass et al. ....... 375/135 |
| 6,952,456 B1 * | 10/2005 | Aiello et al. ................ 375/295 |
| 7,006,553 B1 * | 2/2006 | McCorkle ................... 375/130 |
| 7,010,056 B1 * | 3/2006 | McCorkle et al. .......... 375/295 |
| 7,027,493 B2 * | 4/2006 | Richards ..................... 375/150 |

FOREIGN PATENT DOCUMENTS

| | | |
|---|---|---|
| JP | 2-137533 | 5/1990 |
| JP | 11-27180 | 1/1999 |
| JP | 11-284599 | 10/1999 |
| JP | 11-313005 | 11/1999 |
| WO | WO01/11814 A1 | 2/2001 |
| WO | WO01/39451 A1 | 5/2001 |
| WO | WO01/93441 A1 | 12/2001 |
| WO | WO01/99300 A2 | 12/2001 |

* cited by examiner

800

| S1 | 1 | 2 | 3 | 4 | 5 | 6 | 7 |
|----|---|---|---|---|---|---|---|
| S2 | 1 | 3 | 5 | 7 | 2 | 4 | 6 |
| S3 | 1 | 4 | 7 | 3 | 6 | 2 | 5 |
| S4 | 1 | 5 | 2 | 6 | 3 | 7 | 4 |
| S5 | 1 | 6 | 4 | 2 | 7 | 5 | 3 |
| S6 | 1 | 7 | 6 | 5 | 4 | 3 | 2 |

FIG. 8

MULTI-BAND ULTRA-WIDE BAND COMMUNICATION METHOD AND SYSTEM

RELATED APPLICATIONS

This application is a Continuation-In-Part of, and claims priority to, U.S. application Ser. No. 10/389,789, filed on Mar. 17, 2003 and entitled, "Communication Method, System and Apparatus Utilizing Burst Symbol Cycles," which application is hereby incorporated herein by reference in its entirety.

Additionally, this application claims priority to U.S. Provisional Application No. 60/404,070 filed on Aug. 16, 2002, entitled, "Communication Method, System and Apparatus Utilizing Burst Symbol Cycles," and to U.S. Provisional Application No. 60,450,737, filed on Feb. 28, 2003, entitled, "Communication Method, System and Apparatus Utilizing Burst Symbol Cycles," both of which applications are hereby incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to communication methods, systems, and apparatuses, and in particular to ultra-wide band based wireless communication methods, systems, and apparatuses.

The demand for short to medium range, high speed connectivity for multiple digital devices in a local environment continues to rise sharply. For example, many workplaces and households today have many digital computing or entertainment devices such as desktop and laptop computers, television sets and other audio and video devices, DVD players, cameras, camcorders, projectors, handhelds, and others. Multiple computers and television sets, for instance, have become common in American households. In addition, the need for high speed connectivity with respect to such devices is becoming more and more important. These trends will inevitably increase even in the near future.

As the demand for high speed connectivity increases along with the number of digital devices in typical households and workplaces, the demand for wireless connectivity naturally grows commensurately. High-speed wiring running to many devices can be expensive, awkward, impractical and inconvenient. High speed wireless connectivity, on the other hand, offers many practical and aesthetic advantages, which accounts the great and increasing demand for it. Ideally, wireless connectivity in a local environment should provide high reliability, low cost, low interference caused by physical barriers such as walls or by co-existing wireless signals, security, and high speed data transfer for multiple digital devices. Existing narrowband wireless connectivity techniques do not provide such a solution, having problems such as high cost, unsatisfactory data transfer rates, unsatisfactory freedom from signal and obstacle related interference, unsatisfactory security, and other shortcomings. In fact, the state of the art does not provide a sufficiently satisfactory solution for providing high speed wireless connectivity for multiple digital devices in a local environment.

The state of the art in wireless connectivity generally includes utilization of spread spectrum systems for various applications. Spread spectrum techniques, which spread a signal over a broad range of frequencies, are known to provide high resistance against signal blocking, or "jamming," high security or resistance against "eavesdropping," and high interference resistance. Spread Spectrum techniques have been used in systems in which high security and freedom from tampering is required. Additionally, Code Division Multiple Access (CDMA), a spread spectrum, packet-based technique, is used in some cellular phone systems, providing increased capacity in part by allowing multiple simultaneous conversation signals to share the same frequencies at the same time.

Known spread spectrum and modulation techniques, including CDMA techniques, direct sequence spread spectrum (DSSS) techniques, time hopping spread spectrum (THSS) techniques, and pulse position modulation (PPM) techniques, do not satisfactorily provide wireless connectivity in a local environment, including high reliability, low cost, low interference, security, and high speed data transfer for multiple digital devices. In addition, known UWB transmission and communication methods and systems lack satisfactory quality in areas that can include flexibility, adaptivity and adaptive trade-off capabilities in areas such as power usage, range, and transfer rates, and low cost implementation.

A number of U.S. and non-U.S. patents and patent applications discuss spread spectrum or UWB related systems for various uses, but are nonetheless in accordance with the above described state of the art. The U.S. and non-U.S. patents and patent applications discussed below are hereby incorporated herein by reference in their entirety.

There are several Japanese patents and applications in some of these areas. Japanese patent application JP 11284599, filed on Mar. 31, 1998 and published on Oct. 15, 1999, discusses spread spectrum CDMA mobile communications. Japanese patent application JP 11313005, filed on Apr. 27, 1998 and published on Nov. 9, 1999, discusses a system for rapid carrier synchronization in spread spectrum communication using an intermittently operative signal demodulation circuit. Japanese patent application JP 11027180, filed on Jul. 2, 1997 and published on Jan. 29, 1999, and counterpart European application EP 0889600 discuss a receiving apparatus for use in a mobile communications system, and particularly for use in spread spectrum Code Division Multiple Access communications between a base station and a mobile station. Japanese patent application JP 21378533, filed on Nov. 18, 1988 and published on May 25, 1990, discusses a transmitter for spread spectrum communication.

A number of U.S. patents and published applications discuss spread spectrum or UWB in various contexts. U.S. Pat. No. 6,026,125, issued Feb. 15, 2000 to Larrick, Jr. et al., relates to utilization of a carrier-controlled pulsed UWB signal having a controlled center frequency and an adjustable bandwidth. U.S. Pat. No. 6,351,652, issued Feb. 6, 2002 to Finn et al., discusses impulse UWB communication. U.S. Pat. No. 6,031,862, issued Feb. 29, 2000 to Fullerton et al., and related patents including U.S. Pat. Nos. 5,677,927, 5,960,031, 5,963,581, and 5,995,534, discuss a UWB communications system in which impulse derived signals are multiplied by a template signal, integrated, and then demodulated, to increase the usability if signals which would otherwise be obscured by noise. U.S. Pat. No. 6,075,807, issued Jun. 13, 2000 to Warren et al., relates to a spread spectrum digital matched filter. U.S. Pat. No. 5,177,767, issued Jan. 5, 1993 to Kato, discusses a "structurally simple" wireless spread spectrum transmitting or receiving apparatus which is described as eliminating the need for code synchronization. U.S. Pat. No. 6,002,707, issued Dec. 14, 1999 to Thue, relates to radar system using a wide frequency spectrum signal for radar transmission to eliminate the need for very high energy narrow pulse transmitter and receiver systems. U.S. Pat. No. 5,347,537, issued Jun. 21, 1994 to Mori, et al., and related patents including U.S. Pat. Nos. 5,323,419 and 5,218,620, discuss a direct sequence spread spectrum transmitter and receiver system. U.S. Pat. No. 5,206,881, issued Apr. 27, 1993, discusses a spread spectrum communication system attempting to use rapid synchronization of pseudonoise code signals with data packet signals.

A number of published PCT international applications also discuss spread spectrum or UWB in various contexts. PCT international application, publication number WO 01/39451 published on May 31, 2001, discusses a waveform adaptive transmitter for use in radar or communications applications. PCT international application, publication number WO 01/93441, published on Dec. 6, 2001, discusses a UWB high-speed digital communication system using wavelets or impulses. PCT international application, publication number WO 01/99300, published on Dec. 27, 2001, discusses wireless communications using UWB signaling. PCT international application, publication number WO 01/11814, published on Feb. 15, 2001, discusses a transmission method for broadband wired or wireless transmission of information using spread spectrum technology.

In accordance with all of the above, there is a need in the art for an improved communication methods and systems. Additionally, there is a need in the art for methods and systems to provide wireless connectivity between multiple digital devices in a local environment.

SUMMARY OF THE INVENTION

The present invention provides communication methods and systems, including multi-band ultra-wide band communication methods and systems. In some embodiments, methods and systems are provided in which frequency sub-bands of an ultra-wide band spectrum are allocated for signal transmission. An ultra-wide band transmission including the information is sent, including sending a signal over each of the plurality of sub-bands.

In some embodiments, methods are provided in which a first data signal containing information is converted into an encoded signal using an Inverse Fast Fourier Transform. The encoded signal is converted into an encoded pulsed ultra-wide band signal that can be pulsed or transmitted using burst symbol cycles. The encoded pulsed ultra-wide band signal is decoded using a Fast Fourier Transform to obtain the information.

In some embodiments, the invention provides a method for transmitting information, including allocating, for signal transmission, each of a plurality of frequency sub-bands of an ultra-wide band spectrum. The method further includes sending an ultra-wide band transmission including the information over the ultra-wide band spectrum, including sending a signal over each of the plurality of sub-bands.

In another embodiment, the invention provides a method for receiving information including allocating, for signal reception, each of a plurality of frequency sub-bands of an ultra-wide band spectrum. The method further includes receiving an ultra-wide band transmission including the information over the ultra-wide band spectrum, including receiving a signal over each of the plurality of sub-bands.

In another embodiment, the invention provides a method for communicating information, including allocating, for signal transmission, each of a plurality of frequency sub-bands of an ultra-wide band spectrum. The method further includes sending an ultra-wide band transmission including the information over the ultra-wide band spectrum, including sending a signal over each of the plurality of sub-bands. The method further includes receiving the ultra-wide band transmission including the information over the ultra-wide band spectrum, including receiving the signals.

In another embodiment, the invention provides a system for communicating information, including allocating, for signal transmission, each of a plurality of frequency sub-bands of an ultra-wide band spectrum. The system further includes a transmitter for sending an ultra-wide band transmission including the information over the ultra-wide band spectrum, including sending a signal over each of the plurality of sub-bands. The system further includes a receiver for receiving the ultra-wide band transmission including the information over the ultra-wide band spectrum, including receiving the signals.

In another embodiment, the invention provides a method for communicating information, including converting a first data signal containing information into an encoded signal using an Inverse Fast Fourier Transform. The method further includes converting the encoded signal into an encoded ultra-wide band signal including burst symbol cycles. The method further includes decoding the encoded ultra-wide band signal using a Fast Fourier Transform to obtain the information.

In another embodiment, the invention provides a method for communicating information, including converting a first data signal containing information into an encoded signal using an Inverse Fast Fourier Transform. The method further includes converting the encoded signal into an encoded pulsed ultra-wide band signal. The method further includes decoding the encoded pulsed ultra-wide band signal using a Fast Fourier Transform to obtain the information.

In another embodiment, the invention provides a method for transmitting information, including, after modulation of a narrowband signal, translating the narrowband signal containing the information into a second signal containing the information, the second signal being a wider band signal than the narrowband signal, and the narrowband signal and the second signal including the same modulated waveform.

In another embodiment, the invention provides a method for transmitting information, including transmitting, for a first period of time of each of a series of cycles, one or more bits of the information at a faster rate than a rate at which the one or more bits information would be transmitted if the one or more bits of information were transmitted using the narrowband signal.

In some embodiments, the invention provides a method for transmitting information, including transmitting information as a series of burst symbol cycles. Each burst symbol cycle includes an ON period during which one or more symbols are transmitted, each symbol being a bit sequence, each bit sequence mapping to one or more bits of the information, and an OFF period during which no information is transmitted. Bits of the information are mapped to symbols before the symbols are transmitted.

In another embodiment, the invention provides a method for receiving information, including receiving a continuous series of burst symbol cycles. Each burst symbol cycle includes an ON period during which one or more symbols are received, each symbol being a bit sequence, each bit sequence mapping to one or more bits of the information, and an OFF period during which no information is received. Symbols are mapped to bits of the information after the symbols are received.

In another embodiment, the invention provides a method for transmitting information, including translating a continuous signal stream into a series of burst symbol cycles. Each burst symbol cycle includes an ON period during which one or more bits of information is transmitted, and an OFF period during which no information is transmitted.

In other embodiments, the invention provides a method for transmitting information, including translating a narrowband signal into a wider band signal in which blocks of information from the narrowband signal are transmitted at a faster rate in the wider band signal than a transmission rate of the information in the narrowband signal. In one embodiment, blocks of information are transmitted in the wider band signal using a series of burst symbol cycles.

In other embodiments, the invention provides a method for transmitting information, including translating a narrowband signal into a wideband signal including a series of burst symbol cycles. Each burst symbol cycle includes an ON period during which one or more bits of information is transmitted, and an OFF period during which no information is transmitted. The wideband signal can be either carrier based or non-carrier based.

In another embodiment, the invention provides a method for transmitting information, including translating a continuous signal stream into a series of burst symbol cycles. Each burst symbol cycle includes an ON period during which one or more symbols are transmitted, each symbol being a bit sequence, each bit sequence mapping to one or more bits of the information, and an OFF period during which no information is transmitted.

In some embodiments, the invention provides a method for wirelessly transmitting information, including transmitting information as a series of burst symbol cycles. Each burst symbol cycle includes an ON period during which one or more symbols are transmitted, each symbol being a bit sequence, each bit sequence mapping to one or more bits of the information, and an OFF period during which no information is transmitted. Bits of the information are mapped to symbols before the symbols are transmitted.

In another embodiment, the invention provides a method for wirelessly receiving information, including receiving a continuous series of burst symbol cycles. Each burst symbol cycle includes an ON period during which one or more symbols are received, each symbol being a bit sequence, each bit sequence mapping to one or more bits of the information, and an OFF period during which no information is received. Symbols are mapped to bits of the information after the symbols are received.

In another embodiment, the invention provides a method for wirelessly transmitting information, including translating a continuous signal stream into a series of burst symbol cycles. Each burst symbol cycle includes an ON period during which one or more bits of information is transmitted, and an OFF period during which no information is transmitted.

In another embodiment, the invention provides a method for wirelessly transmitting information, including translating a continuous signal stream into a series of burst symbol cycles. Each burst symbol cycle includes an ON period during which one or more symbols are transmitted, each symbol being a bit sequence, each bit sequence mapping to one or more bits of the information, and an OFF period during which no information is transmitted.

In another embodiment, the invention provides a wideband based method for wirelessly transmitting information, including transmitting information as a series of burst symbol cycles. Each burst symbol cycle includes an ON period during which one or more symbols are transmitted, each symbol being a chip sequence, each chip sequence mapping to one or more bits of the information, and an OFF period during which no information is transmitted. Bits of the information are mapped to symbols before the symbols are transmitted.

In another embodiment, the invention provides a wideband based method for wirelessly receiving information, including receiving a continuous series of burst symbol cycles. Each burst symbol cycle includes an ON period during which one or more symbols are received, each symbol being a chip sequence, each chip sequence mapping to one or more bits of the information, and an OFF period during which no information is received. Symbols are mapped to bits of the information after the symbols are received.

In another embodiment, the invention provides a UWB based method for transmitting information, including transmitting information as a series of burst symbol cycles. Each burst symbol cycle includes an ON period during which one or more symbols are transmitted, each symbol being a chip sequence, each chip sequence mapping to one or more bits of the information, and an OFF period during which no information is transmitted. Bits of the information are mapped to symbols before the symbols are transmitted.

In another embodiment, the invention provides a UWB based method for receiving information, including receiving a continuous series of burst symbol cycles. Each burst symbol cycle includes an ON period during which one or more symbols are received, each symbol being a chip sequence, each chip sequence mapping to one or more bits of the information, and an OFF period during which no information is received. Symbols are mapped to bits of the information after the symbols are received.

In some embodiments, the invention provides methods for UWB based communication in which information is transmitted utilizing a continuous series of burst symbol cycles, each burst symbol cycle including an ON period during which a number of chips representing a bit of information are transmitted using an ultra-wide band signal, and an OFF period during which no signal is transmitted.

In some embodiments, the methods and systems utilize direct sequence spread spectrum (DSSS) transmission techniques to transmit the signal during the ON periods, and, in some embodiments, binary phase shift keying (BPSK) techniques are utilized to modulate a carrier signal to carry the information. In some embodiments, a duration of each ON and OFF period is varied to provide optimal performance based on variable parameters, such as range, transfer rate, or maximum power usage rate limitations or requirements.

In some embodiments, the methods and systems provide advantages that can include high data transfer rate capability, low power usage, security, low interference susceptibility, low cost implementation, flexibility, scalability, adaptability, and adaptive tradeoff capabilities relating to parameters such as power usage, range, and transfer rates.

In some embodiments, the invention provides a system for UWB based, high data transfer rate wireless communication between digital devices, such as, for example, digital devices within a local area such as a home, a building or several buildings, and the system utilizing burst symbol cycle transmission techniques or modulation techniques as described above, or both. In some embodiments, the system further provides the advantages of modularity, auto-configuration, usability in various network topologies, and usability in a wide range of entertainment and computing applications that can require high data transfer rates.

In some embodiments, the techniques of the invention can be used effectively to facilitate communication between a network or group of many users (or communicating devices), and including many cells of users. For example, embodiments of the invention including the use of time division multiplexing (TDM) can be used to facilitate synchronous and asynchronous communication between users or devices in a single cell. Additionally, in applications including communication between users or devices in different cells, some embodiments of the invention include the use of orthogonal or semi-orthogonal sequences to differentiate between users in different cells. Multiple user or multiple device embodiments of the invention, as described herein, generally can include multiple user and device embodiments.

In one embodiment, the invention provides an ultra-wide band based wireless communication method. The method includes, utilizing a transmitter, wirelessly transmitting the information. The method further includes, utilizing a receiver, receiving the transmitted information. Transmitting the information includes utilizing a series of burst symbol cycles, each burst symbol cycle including an ON period during which a plurality of chips are transmitted using an ultra-wide band signal, the plurality of chips being utilized to represent a bit of information, and an OFF period during which no signal is transmitted.

In another embodiment, the invention provides an ultra-wide band based wireless communication system. The system includes a transmitter for wirelessly transmitting the information. The system further includes a receiver for receiving the transmitted information. The transmitter transmits the information utilizing a series of burst symbol cycles, each burst symbol cycle including an ON period during which a plurality of chips are transmitted using an ultra-wide band signal, the plurality of chips being utilized to represent a bit of information, and an OFF period during which no signal is transmitted.

In another embodiment, the invention provides an ultra-wide band based wireless communication apparatus. The apparatus includes a transmitter for wirelessly transmitting the information. The apparatus further includes a receiver for receiving the transmitted information. The transmitter transmits the information utilizing a series of burst symbol cycles, each burst symbol cycle including an ON period during which a plurality of chips are transmitted using an ultra-wide band signal, the plurality of chips being utilized to represent a bit of information, and an OFF period during which no signal is transmitted.

In another embodiment, the invention provides a system for ultra-wide band based wireless communication between digital devices. The system includes a first digital device including a transmitter and a receiver, and a second digital device including a transmitter and a receiver, in which the transmitters and the receivers of the digital devices are for facilitating wireless communication between the devices. The transmitters are for wirelessly transmitting information, and the receivers are for wirelessly receiving the transmitted information. The transmitters transmit the information utilizing a series of burst symbol cycles, each burst symbol cycle including an ON period during which a plurality of chips are transmitted using an ultra-wide band signal, the plurality of chips being utilized to represent a bit of information, and an OFF period during which no signal is transmitted.

In another embodiment, the invention provides an ultra-wide band based wireless communication method. The method includes, utilizing a transmitter, wirelessly transmitting the information. The method further includes, utilizing a receiver, receiving the transmitted information. Transmitting the information includes utilizing a series of burst symbol cycles, each burst symbol cycle including an ON period during which a plurality of bits are transmitted using an ultra-wide band signal, the plurality of bits being utilized to represent a bit of information, and an OFF period during which no signal is transmitted.

In another embodiment, the invention provides a method for transmitting information, including transmitting, for a first period of time of each of a series of burst symbol cycles, one or more symbols, in which each of the symbols includes a bit sequence, and in which each of the bit sequences maps to one or more bits of the information. The method further includes suspending transmission for a second period of time of each of the series of burst symbol cycles.

In another embodiment, the invention provides a method for receiving information, including receiving, for a first period of time of each of a series of burst symbol cycles, one or more symbols, in which each of the symbols includes a bit sequence, and in which each of the bit sequences maps to one or more bits of the information. The method further includes suspending reception for a second period of time of each of the series of burst symbol cycles.

In another embodiment, the invention provides a method for transmitting information, including translating a continuous signal into a series of burst symbol cycles. The method further includes transmitting, for a first period of time of each of the series of burst symbol cycles, one or more symbols, in which each of the symbols includes a bit sequence, and in which each of the bit sequences maps to one or more bits of the information. The method further includes suspending transmission for a second period of time of each of the series of burst symbol cycles.

In another embodiment, the invention provides a method for transmitting information, including translating a narrowband signal containing the information into a second signal containing the information, the second signal being a wider band signal than the narrowband signal. The method further includes transmitting, for a first period of time of each of a series of cycles, one or more bits of the information at a faster rate than a rate at which the one or more bits information would be transmitted if the one or more bits of information were transmitted using the narrowband signal.

In another embodiment, the invention provides a method for transmitting information, including translating a continuous signal containing the information into a second signal containing the information, the second signal including a series of burst signal cycles. The method further includes transmitting, for a first period of time of each of the series of burst symbol cycles, one or more symbols, each symbol including a bit sequence, in which each of the bit sequences maps to one or more bits of the information. The method further includes suspending transmission for a second period of time of each of the series of burst symbol cycles.

In another embodiment, the invention provides a method for transmitting information, including transmitting, using an ultra-wide band signal, for a first period of time of each of a series of burst symbol cycles, a plurality of chips. The method further includes suspending transmission for a second period of time of each of the series of burst symbol cycles.

In another embodiment, the invention provides an ultra-wide band based wireless communication system, the system including a transmitter for transmitting, using an ultra-wide band signal, for a first period of time of each of a series of burst symbol cycles, one or more symbols, in which each of the symbols includes a bit sequence, and in which each of the bit sequences maps to one or more bits of the information. The transmitter is further for suspending transmission for a second period of time of each of the series of burst symbol cycles. The system further includes a receiver for receiving the transmitted symbols.

In another embodiment, the invention provides an ultra-wide band based wireless communication system, the system including a transmitter for transmitting, using an ultra-wide band signal, for a first period of time of each of a series of burst symbol cycles, a plurality of chips. The transmitter is further for suspending transmission for a second period of time of each of the series of burst symbol cycles. The system further includes a receiver for receiving the transmitted chips.

In another embodiment, the invention provides an ultra-wide band based wireless communication apparatus, including a transmitter for transmitting, using an ultra-wide band signal, for a first period of time of each of a series of burst symbol cycles, a plurality of chips. The transmitter is further for suspending transmission for a second period of time of each of the series of burst symbol cycles. The apparatus further includes a receiver for receiving the transmitted chips.

In another embodiment, the invention provides a system for ultra-wide band based communication between digital devices, including a first digital device including a first transmitter and a first receiver. The system further includes a second digital device including a second transmitter and a second receiver. The first and the second transmitters and the first and the second receivers facilitate communication between the first and the second digital devices. The first and the second transmitters are for transmitting, using an ultra-wide band signal, for a first period of time of each of a series of burst symbol cycles, a plurality of chips. The first and the second transmitters are further for suspending transmission for a second period of time of each of the series of burst symbol cycles. The system further includes a receiver for receiving the transmitted chips.

In another embodiment, the invention provides a method for transmitting information, including means for transmitting, for a first period of time of each of a series of burst symbol cycles, one or more symbols, in which each of the symbols includes a bit sequence, and in which each of the bit sequences maps to one or more bits of the information. The method further includes means for suspending transmission for a second period of time of each of the series of burst symbol cycles.

Additional aspects of the present invention will be apparent in view of the description which follows.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 8 is a table depicting time-frequency interleaving sequences, according to one embodiment of the invention;

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
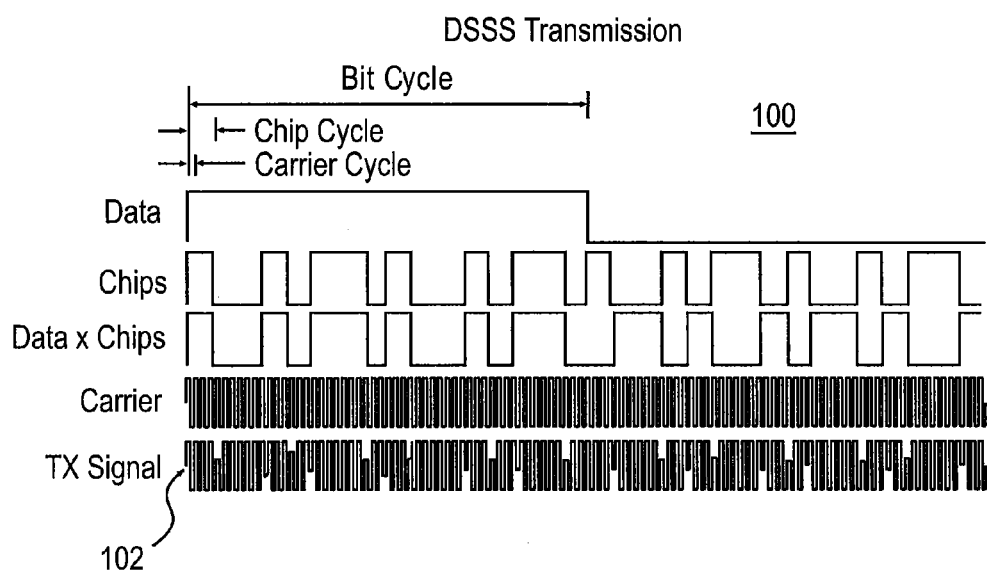
FIG. 1 is a timing diagram that depicts characteristics of a prior art direct sequence spread spectrum transmission technique.
Figure 2:
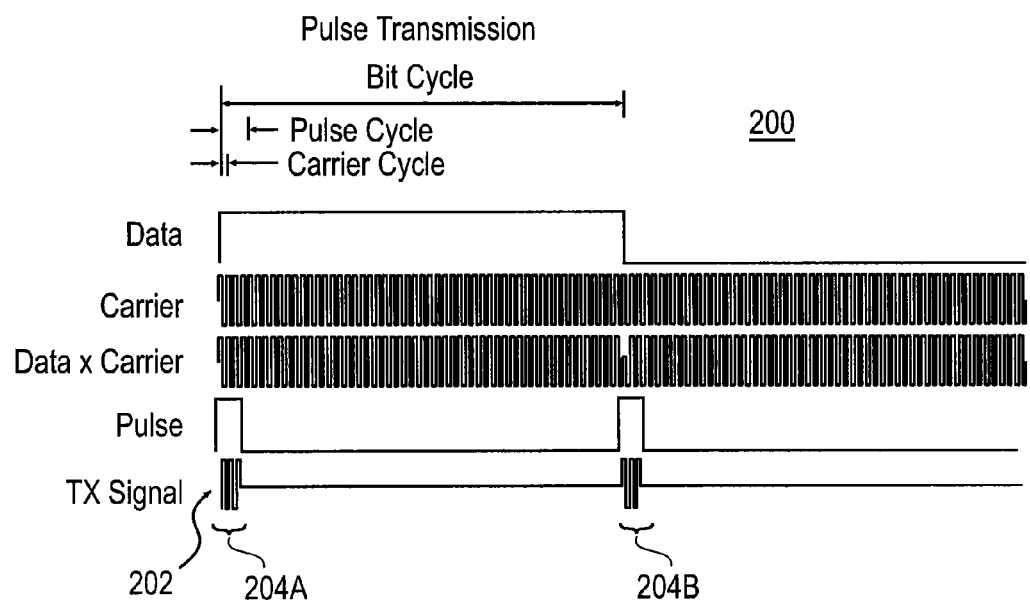
FIG. 2 is a timing diagram that depicts characteristics of a prior art pulse position modulation spread spectrum transmission technique.

FIGS. 1 and 2 are timing diagrams that depict examples of existing transmission techniques that can be used in spread spectrum techniques. Specifically, FIG. 1 is a timing diagram that depicts characteristics 100 of an existing direct sequence spread spectrum (DSSS) transmission technique utilizing a binary phase shift keying modulation technique, and FIG. 2 is a timing diagram that depicts characteristics 200 of an existing pulse position transmission technique.

In FIG. 1, as shown by the transmitted signal, or TX signal 102, the DSSS transmission techniques utilize continuous transmission of BPSK modulated signal. As with spread spectrum systems generally, each bit of information is represented by a number of transmitted chips. It is to be noted that, in the usual computer parlance, a bit is the smallest unit of information, and a binary bit is usually represented as a "0" or a "1". In this usual computer parlance, a chip is in fact a bit. Typically in spread spectrum system parlance, however, the term "bit" is utilized to mean a bit of information before spreading, and the term "chip" is typically utilized to mean a bit of information after spreading, which is utilized in combination with other chips to represent a single bit of information existing prior to spreading.

FIG. 2 depicts characteristics 200 of a prior art pulse transmission, including transmitted signal, or TX signal 202. As depicted in transmitted signal 202, the signal consists of intermittent pulses 204A, 204B, each of the pulses 204A, 204B being used to transmit one or more bits of information (the term "bit" as used in this paragraph having a meaning in accordance with typical computer parlance, meaning any smallest unit of information). Pulse transmission techniques, in which intermittent single bits are transmitted, can be used in spread spectrum as well as non-spread spectrum techniques, and with modulation techniques such as pulse amplitude modulation, pulse position modulation (PPM), or other pulse timing based modulation.

Figure 3:
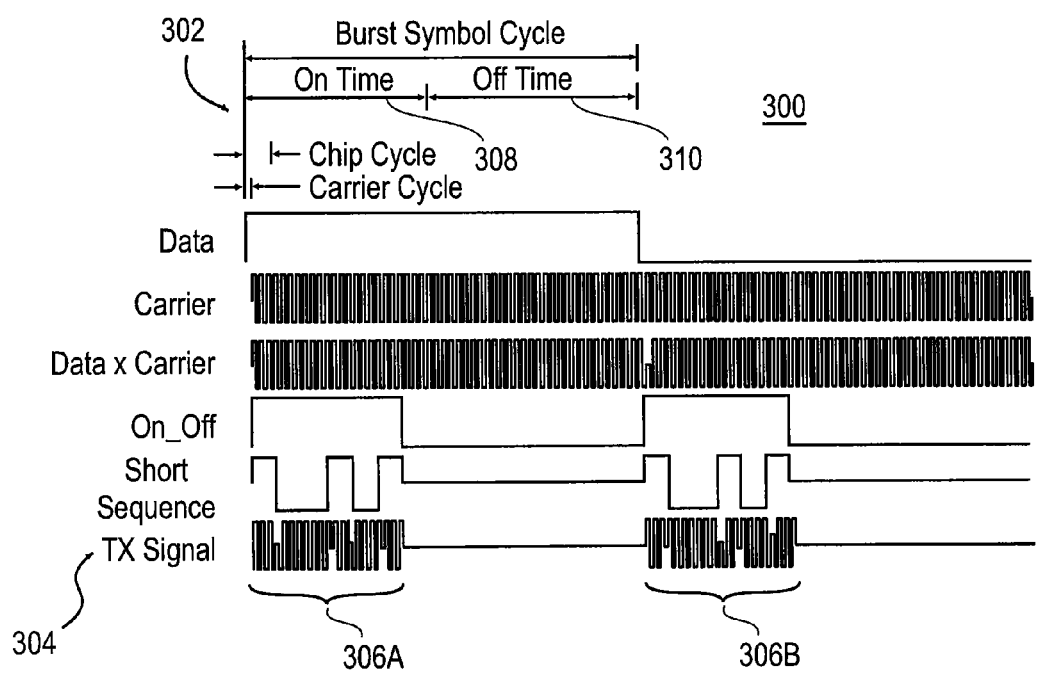
FIG. 3 is a timing diagram that depicts characteristics of a burst symbol cycle based transmission, according to one embodiment of the invention.

FIG. 3 is a timing diagram that depicts characteristics 300 of a burst symbol cycle based transmission 304, according to one embodiment of the invention. A burst symbol cycle based transmission 304 is depicted. Each burst symbol cycle includes an ON period during which a number of chips representing a bit of information are transmitted using an ultra-wide band signal, and an OFF period during which no signal is transmitted. In this embodiment, each burst symbol cycle is used to transmit a number of chips which represent a bit. As depicted, burst symbol cycle 302 includes ON period 308 followed by OFF period 310. As depicted, each ON period transmission 306A, 306B contains a number of consecutive, uninterrupted transmitted chips 306. In the embodiment depicted, binary phase shift keying (BPSK) is used to modulate the transmitted signal 304 to carry the chips. In other embodiments of the invention, however, many other forms of modulation can be utilized, including other phase modulation techniques such as quaternary phase shift keying (QPSK), position based modulation, combinations of phase and position based modulation, and various other modulation techniques, including various modulation techniques typically associated with narrow band transmission systems. For example, in some embodiments, narrowband signals are translated into a series of burst symbol cycles and can be transformed into a UWB signal, which techniques can include multiplication of the narrowband signal by a wideband burst symbol cycle signal (which can be either a carrier based or non-carrier based signal, as further described in Appendix C of previously incorporated by reference U.S. Provisional Patent Application No. 60/404,070), or even a general wavelet.

In some embodiments of the invention, information to be transmitted is translated into a symbol, the symbol being a sequence of bits that maps to, or is used to represent, one or more bits of information to be transmitted. The bit sequence is generally different than the one or more bits of information, but, in some embodiments, can be identical. In addition, in some embodiments, in which the bit sequence is identical to the one or more bits of information to be transmitted, mapping can be unnecessary (both on a transmitting and receiving end), and therefore not included. As such, in some embodiments, the term "symbol" can simply include signals or bits of information to be transmitted or received.

Generally, however, bits of information are mapped to one or more symbols, and the symbols are transmitted during an ON period. On a receiving end, the one or more symbols are received during an ON period, and then mapped, or decoded, to the one or more bits of information the symbols are used to represent. Although generally a symbol maps to one or more bits of information, it is to be noted that, in some embodiments of the invention, more than one symbol or burst can be used to represent a single bit of information.

In some embodiments, the bit sequences of the symbols can be chosen or varied to control or create trade-offs between system parameters. For example, peak to average power ratio and spectral shaping or widening can be controlled by such techniques. It is to be noted that, in some embodiments of the invention, sequences do not have to be repeated or constant, but can change between, for example, bits or groups of bits, packets, or cells. It is to be noted, however, that, in some embodiments of the invention, other techniques besides sequencing related techniques can be used to control various system parameters, including the use of orthogonal frequency division multiplexing, or OFDM, as discussed subsequently herein.

Furthermore, in some embodiments, each burst can be transmitted using a different frequency or frequency range, or in more than one frequency or frequency range, or in different positions, including, for example, embodiments of the invention using two-plane transmitting.

In addition, in some embodiments of the invention, lengths of ON periods and lengths of OFF periods change from cycle to cycle.

In general, burst symbol cycle transmission, according to various embodiments of the invention, provide greater flexibility and control of system parameters, including bit rates, and duty cycles. For example, pulse transmission generally uses either pulse position modulation or pulse amplitude modulation. The relatively simple pulse transmission techniques do not allow the degree of control over system parameters as do the techniques of the present invention. In addition, various narrowband and spread spectrum techniques also do not allow such control. For example, spread spectrum DSSS techniques generally provide lower peak power than, for example, pulse transmission techniques, but higher overall power consumption. Pulse transmission techniques, conversely, provide lower overall power consumption than DSSS techniques, but higher peak power. In addition, in some embodiments of the invention, spectral shaping is controlled by selecting polarity of signals of an ON period of a burst symbol cycle, which is an advantage over pulse transmission techniques, which have a constant spectral shape that cannot be controlled in the manner just described. In addition, some embodiments of the present invention provide advantageous trade off control capability, in comparison with DSSS techniques and pulse techniques, with respect to other parameters, including, for example, filtering, switching. Various embodiments of the present invention, however, allow trade off and control between such parameters, which degree of control is unavailable in existing techniques.

In some embodiments, a continuous or other non-burst symbol cycle data stream or signal is translated into burst symbol cycles before being transmitted. For example, various narrowband transmissions can be converted into wideband burst symbol cycle signals according to the methods of the present invention. By such techniques, the advantages of transmission and reception according to some embodiments of the present invention can be gained, which advantages would be unavailable if information is transmitted and received by existing narrowband techniques. As described in more detail herein, some embodiments of the invention include translating a narrowband signal into a series of burst symbol cycles by multiplying the continuous signal by a burst symbol cycle signal (which can be either a carrier based or non-carrier based signal, or a as further described in Appendix C of previously incorporated by reference U.S. Provisional Patent Application No. 60/404,070), or even a general wavelet. Such techniques can be used, in some embodiments of the invention, to translate a narrowband signal into a wideband or a UWB signal.

In some embodiments of the invention, blocks of a narrowband signal are transmitted at a faster rate than in the original narrowband signal, thus widening the spectrum of the signal, without multiplication by a wider band signal.

In some embodiments of the invention in which information is transmitted (or received) at a faster rate than in an original narrowband signal, blocks of information can be transmitted (or received) in the form of burst symbol cycles including an ON period during which the information of the block is transmitted, followed by an OFF period to fill the remainder of time that would be required for the block of information to be transmitted in the original narrowband signal. Alternatively, a portion of the remainder of time can be used to transmit signal, such as a repeated block or blocks of information, a different block or blocks of information, a partial block or blocks of information, or a varied form of block or blocks of information, such that the OFF period of each cycle is of shorter duration. Furthermore, in some embodiments, the entire remainder period can be used to transmit signal, such that instead of a series of burst symbol cycles, a continuous signal is transmitted.

It is to be noted that the methods of the invention can be used to advantage in wired as well as wireless systems, including wired UWB systems and implementations. It is to be noted, however, that the methods of the invention include embodiments in which no narrowband or other continuous or non-continuous data stream is converted. It is further to be noted that the invention contemplated embodiments including a carrier signal as well as embodiments that do not include a carrier signal (see Appendix C of previously incorporated by reference U.S. Provisional Patent Application No. 60/404,070 for further discussion and examples of carrier and non-carrier based embodiments of the invention).

It is to be noted that, generally, burst symbol cycle transmission causes a wider spectral band than continuous or other non-burst symbol cycle transmissions. For example, translating narrowband data streams into burst symbol cycles generally causes widening of the spectrum utilized. As such, although the techniques of various embodiments of the invention can be applied and are useful in non-UWB contexts, the techniques are generally especially advantageous when utilized for wireless UWB communication, since, among other things, the techniques generally lend themselves best to very wide band communication systems, and also help widen the used spectral bandwidth.

In the embodiment depicted in FIG. 3, burst symbol cycle transmission is utilized in a spread spectrum context. As used herein, the term, "spread spectrum" is not limited to existing spread spectrum techniques, but rather includes any technique, including new techniques as described herein, in which some or several aspects of spread spectrum methodology is a part. In some embodiments, such as the spread spectrum based embodiment depicted in FIG. 3, power control can be implemented by, for example, changing the number of chips per bit.

To support and enable transmissions to multiple different receiving entities, such as, for example, digital or computerized devices, and different chip polarity patterns and sequence positions can be utilized for identification of certain transmitted information as being intended for a particular receiving entity or entities. Such techniques can be utilized to facilitate communication between many users or devices, including multiple cells of users or devices, each cell containing multiple users or devices. Sequences can be the same for all transmitted bits for an intended receiving entity, or can change every bit. Sequences that can be so utilized include, for example, pseudonoise (PN) sequences, Barker sequences, Gold sequences, Kasami sequences, or others.

UWB transmission systems have various uses. UWB transmission systems are typically within the 0 MHz to 5 GHz band, typically cover a large spectrum of above 20% of the center frequency, and typically radiate a power of approximately 1 mW. UWB systems have in the past been used by for radar and radar-like applications, allowing penetration of thick obstacles such as building walls. UWB is also known to provide high resistance against detection and interception, high multipath immunity, high throughput, and precision ranging and localization. Decreased restriction on the use of UWB is expected in the near future.

The present invention provides UWB based communication methods and systems. In some embodiments, the invention provides methods for UWB based communication in which information is transmitted as described with reference to FIG. 3, utilizing a continuous series of burst symbol cycles, each burst symbol cycle including an ON period during which a number of chips representing a bit of information are transmitted using an ultra-wide band signal, and an OFF period during which no signal is transmitted. In some embodiments, narrowband signals are translated into a series of wider band or wide band burst symbol cycles, or are transformed into a UWB signal, and techniques used can include multiplication of the narrowband signal by a burst symbol cycle signal (which can be either a carrier based or non-carrier based signal, or a as further described in Appendix C of previously incorporated by reference U.S. Provisional Patent Application No. 60/404,070), or even a general wavelet. In some embodiments, a duration of each ON and OFF period is varied, such as by using a fast variable ON period, to provide optimal performance based on variable parameters, such as range, transfer rate, or maximum power usage rate limitations or requirements. In some embodiments, the methods and systems provide advantages that can include high data transfer rate capability, low power usage, security, low interference susceptibility, low cost implementation, flexibility, adaptability, and adaptive trade-off capabilities relating to parameters such as power usage, range, and transfer rates.

In some embodiments, the invention provides a system for UWB based, high data transfer rate wireless communication between digital devices, such as, for example, digital devices within a local area such as a home, a building or several buildings, and the system utilizing burst symbol cycle transmission techniques or modulation techniques as described above, or both. In some embodiments, the system further provides the advantages of modularity, auto-configuration, usability in various network topologies, and usability in a wide range of entertainment and computing applications that can require high data transfer rates, including multi-streaming of high quality audio and video, and broadband multimedia applications.

In some embodiments, the physical components, hardware, software, and programs as described herein are implemented utilizing small, low power modular subunits including PHY, MAC, and protocol stack software. In some embodiments, the subunits connect to digital or computerized devices utilizing standard interfaces, such as USB, IEEE 1394, Ethernet, PCMCIA, etc. In some embodiments, auto-configuration is provided, and power can be supplied from standard interfaces. In some embodiments, subunits or other components are mounted on an antenna.

In some embodiments, the methods and systems of the invention are utilized to support a wide range of simultaneously provided wireless services and applications, providing high data transfer rates and a high degree of reliability and quality. For example, supported applications can include high rate distribution of MPEG-2 channels, high quality broadband and multimedia applications. In some embodiments, 100–500 MB/sec or greater maximum transfer rates can be achieved. In some embodiments, higher or middle rate services can be supported for ranges up to about 15–20 meters, and middle or lower rate services for ranges of about 30–50 meters or more. In some embodiments, the invention supports up to at least three independent cells with overlap in a typical building, and supports non-interfering co-existence with other wireless systems in typical environments and use conditions.

Figure 4:
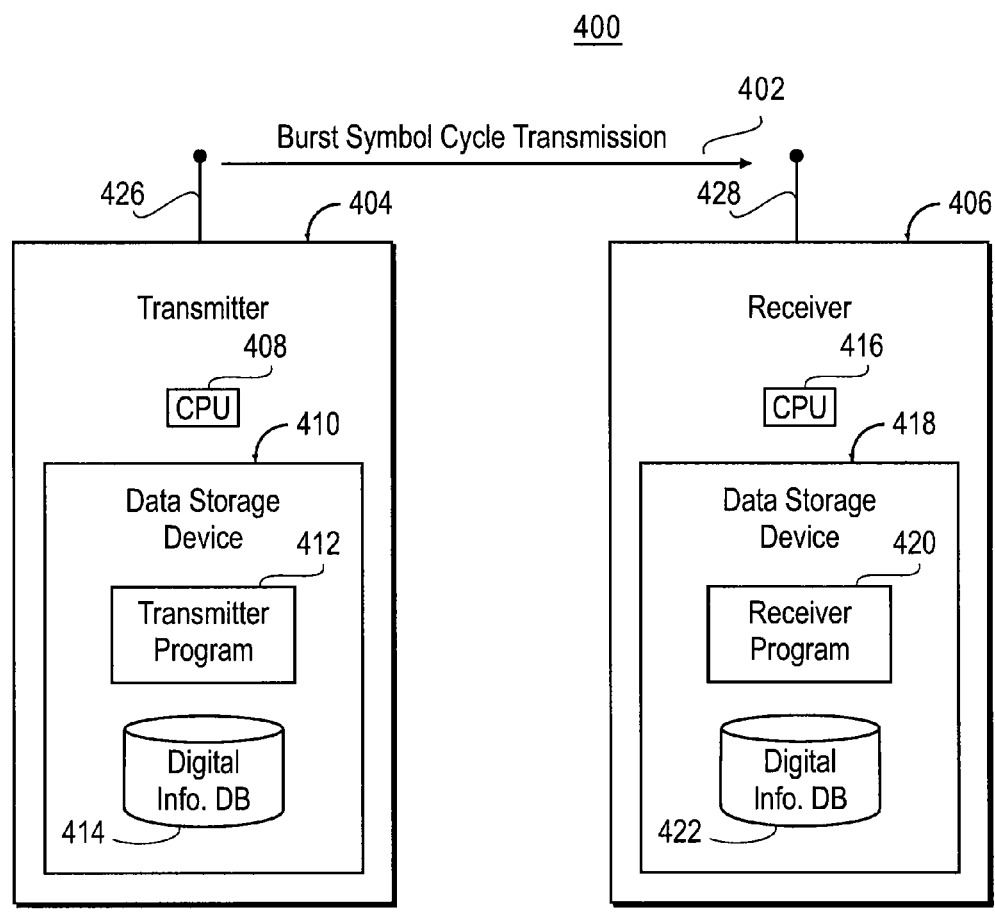
FIG. 4 is a block diagram that depicts a system that utilizes burst symbol cycle transmission and reception, according to one embodiment of the invention.
Figure 5:
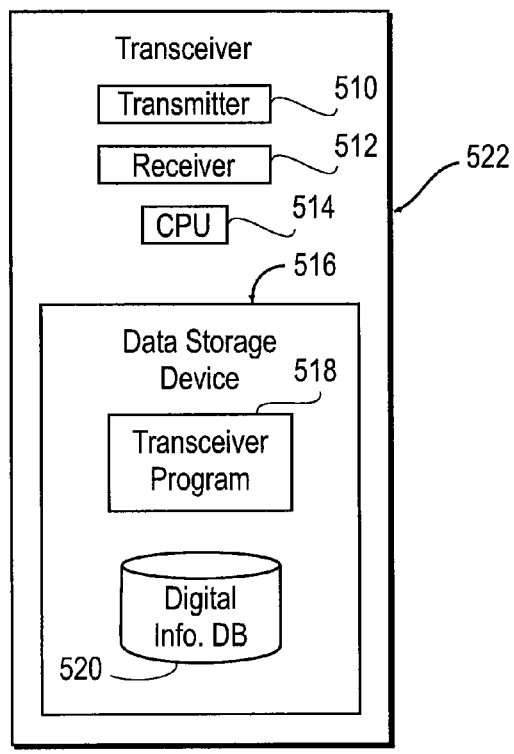
FIG. 5 is a block diagram that depicts a system that utilizes burst symbol cycle bit cycle transmission and reception between two digital devices, according to one embodiment of the invention.
Figure 5:
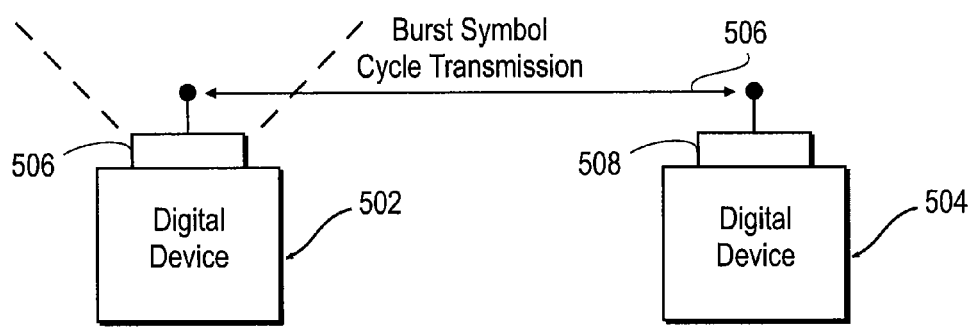
Figure 6:
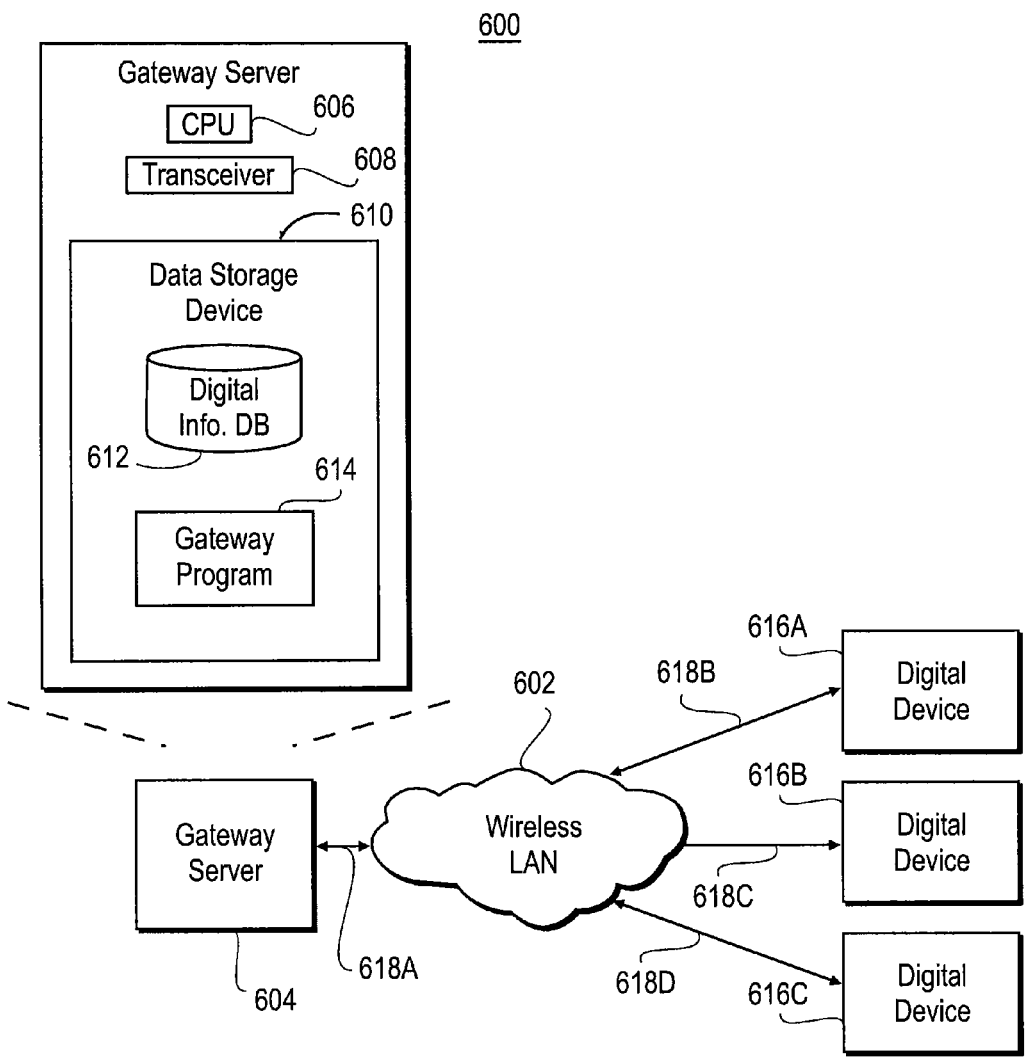
FIG. 6 is a block diagram that depicts a wireless Local area network (LAN) implemented utilizing a gateway server and connecting multiple digital devices, according to one embodiment of the invention.

FIGS. 4–6 are block diagrams that illustrate certain implementations and embodiments of the invention. FIG. 4 depicts a system 400 that utilizes burst symbol cycle transmission and reception, according to one embodiment of the invention. Herein, a burst symbol cycle transmission generally includes a transmission including a continuous series of burst symbol cycles. As depicted, a burst symbol cycle transmission 402 is wirelessly transmitted from a transmitter 404 and received by a receiver 406. Herein, wireless transmissions and wireless communications refer to transmissions and communications that are sent wirelessly from a transmitting entity to a receiving entity; the terms generally do not refer to internal workings of transmitters, receivers, and transceivers, which can involve wires.

Herein, the terms transmitter, receiver, and transceiver generally include devices that include any and all necessary components necessary to implement the functions of the device, including physical components, such as one or more antennas, as well as computerized or computer hardware, software, and programming. The transmitter 404 and receiver 406 each include one or more antennas 426, 428 for transmitting and receiving burst symbol cycle transmissions in accordance with the invention. The transmitter 404 and receiver 406 each include one or more central processing units (CPUs) 408, 416, and one or more data storage devices 410, 418. The data storage device of the transmitter 404 includes a digital information database 414 and a transmitter program 412. The data storage device of the receiver 406 includes a digital information database 422 and a receiver program 412. Data storage devices as described herein can include various amounts of RAM for storing computer programs and other data. In addition, transmitters, receivers, and transceivers as described herein can include various other components typically associated with transmitters, receivers, and transceivers. In different embodiments, transmitters, receivers, and transceivers as described herein can include special or limited purpose computers, or can include general purpose computers that generally operate under and execute computer programs under the control of an operating system, such as Windows, Macintosh, UNIX, etc. Furthermore, transceivers, as described herein, generally includes a device having the functionality of a transmitter and a receiver as described herein, and any such device is considered to include a transmitter and receiver, whether or not physical or any computerized or programming components of the transmitter and receiver are separate or indistinguishably intermingled.

The transmitter program 412 and the receiver program 416 each generally include all programming and applications, programming or application modules, etc. necessary to implement transmission and reception of burst symbol cycle transmissions, respectively, in accordance with the methods of the invention as described herein. In some embodiments, the transmitter 404, the receiver 406, or each, can be replaced with a transceiver, combining the functionality of both a transmitter and a receiver.

Generally, the computer programs of the present invention are tangibly embodied in a computer-readable medium, e.g., one or more data storage devices attached to a computer. In some embodiments under the control of an operating system, computer programs may be loaded from data storage devices into computer RAM for subsequent execution by the CPU. The computer programs include instructions which, when read and executed by the computer, cause the computer to perform the steps necessary to execute elements of techniques described herein.

The digital information databases 414, 422 of the transmitter 404 and the receiver 422 generally include any and all stored information utilized in the functions of the transmitter 404 and the receiver 406. For example, the digital information database 414 of the transmitter 404 includes stored information to be transmitted to the receiver, as well as any and all stored intermediate, processed, coded, and decoded information, in accordance with the methods of the invention as described herein. The digital information database 422 of the receiver 406 generally include any and all received information, as well as any and all intermediate, processed, coded, and decoded information, in accordance with the methods of the invention as described herein. While not shown, in some embodiments, the transmitter 404, as well as transceivers described herein, can obtain or receive information to be stored in the digital information database 414 from various sources and in various ways, such as by wired communication, wireless communication, reading of an external storage device such as a floppy disk or compact disk, or in any of various other ways.

FIG. 5 depicts a system 500 that utilizes burst symbol cycle transmission 506 transmitted by a transmitter 506 of a first digital device 502 and received by a receiver 508 of a second digital device 504. As depicted, the transceiver 522 includes a transmitter 510, a receivers 512, one or more CPUs 514, and one or more data storage devices 516. The data storage device 516 includes a transceiver program and a digital information database 520. It is to be understood that the transceiver 522 generally includes any and all components necessary to allow transmission and reception of burst symbol cycle transmissions in accordance with the invention as described herein. Various different configurations are possible in accordance with the invention. For example, the transmitter 510 and receiver 512 and elements thereof can be separate, as shown, or combined, and CPUs and data storage devices can be included in the transmitter as well as in the receiver, or one or more CPUs, data storage devices, and other elements can be utilized to perform transmitter and receiver functions. As depicted, the data storage device 516 of the transceiver 522 includes transceiver program 518 and digital information database 520, which, alone or in combination with elements of the transmitter 510 and the receiver 512, enable to transceiver to perform burst symbol cycle transmission and reception in accordance with the methods of the invention as described herein.

FIG. 6 depicts a wireless Local area network (LAN) 602 implemented utilizing a gateway server 604 and connecting multiple digital devices 616A, 616B, 616C according to one embodiment of the invention. It is to be noted that, in some embodiments, the invention can be implemented, in a wireless or wired fashion, within or including a personal area network (PAN), or a LAN, or both, or various other types and combinations of networks. The gateway server 604 is a server computer including a CPU 606, a transceiver 608, and a data storage device 610. As depicted, the data storage device includes a digital information database 612 and a home gateway program 614. The gateway server 604 can be an audio/video server or any of various types of servers for various applications. The gateway program 614 generally includes all programming, applications, and programming or application modules necessary to perform the functions of the gateway server 604 as described herein. Specifically, the gateway server 604 is for transmission and reception of burst symbol cycle transmissions as well as management and integration of communication through the wireless LAN 602 to, from, and between the digital devices and the gateway server 604. As depicted, the gateway server 604 coordinates and manages information flow, which can include multiple simultaneous transmissions from transmitting devices intended to be received by one or more particular receiving devices. Arrows 618A, 618B, 618C, and 618D represent burst symbol cycle communications.

Figure 7:
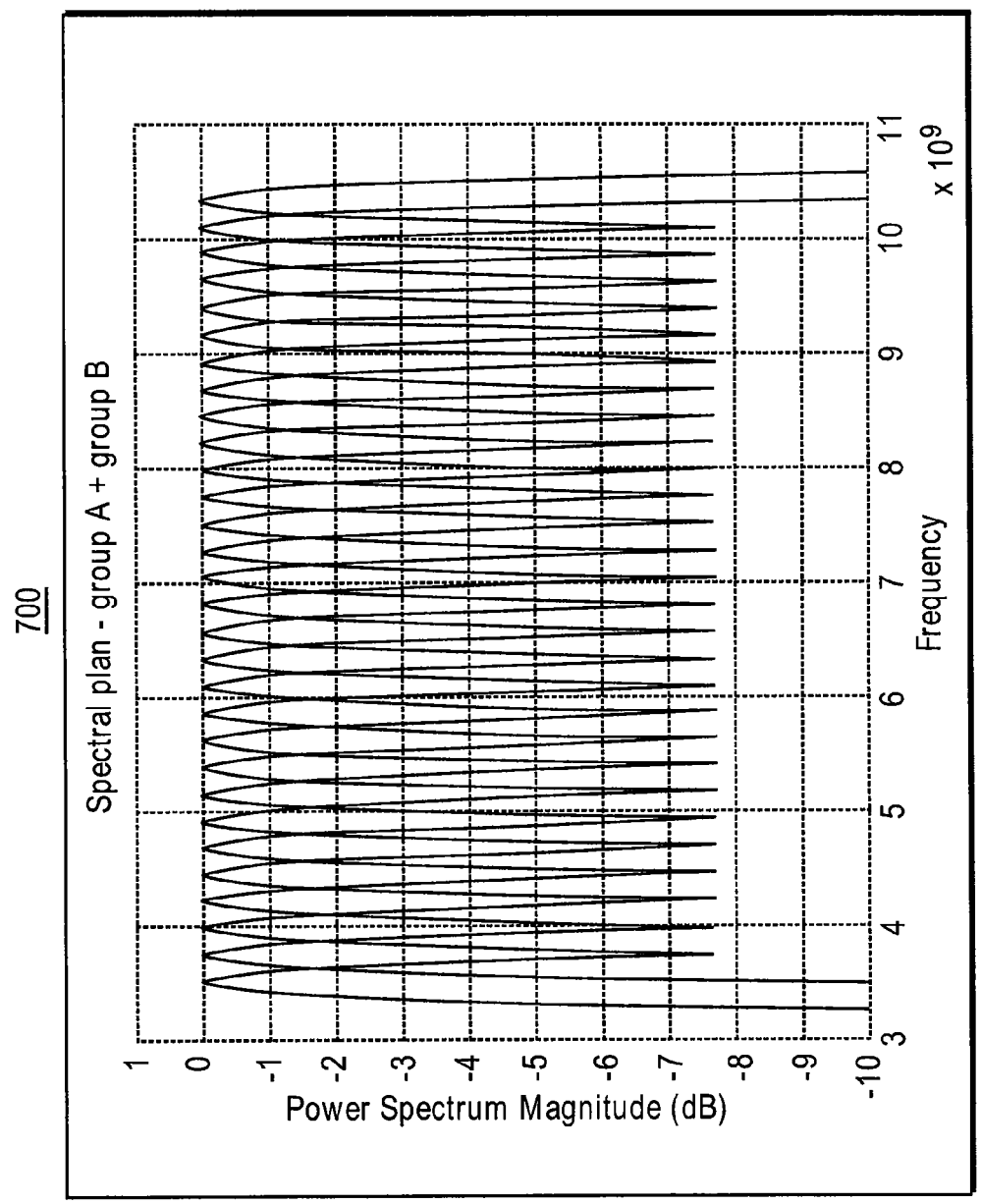
FIG. 7 is a frequency vs. power spectrum magnitude chart of a multi-band UWB implementation, according to one embodiment of the invention.

In some embodiments, in a system using UWB communication, signals may be transmitted using multiple bands. FIG. 7 depicts a frequency vs. power spectrum magnitude chart 700 of a multi-band UWB implementation, according to one embodiment of the invention. FIG. 7 illustrates an embodiment in which the spectrum is divided into a specific number of sub-bands with partial overlap. This divided spectrum has a bandwidth above 500 MHz in order to meet the FCC requirement for UWB. In some embodiments all the bands are used, while in other embodiments the bands are divided into groups. An example depicting two overlapping groups of 15 sub-bands is depicted in FIG. 7.

Various transmission schemes and methods, or combinations thereof, are used in various embodiments of the invention, and are discussed briefly as follows. A band in use can be changed every one or more symbols. Each burst can be transmitted in a different frequency. Each burst can be transmitted in more than one frequency. Additionally, in some embodiments, the frequency or frequencies can be selected according to information to be transmitted, a pseudo-random sequence, or both. The transmission can be continuous, for example, when using the maximal pulse rate, or discontinuous, for example, when using lower rates. Several bands can be used in parallel. The information can be coded on the different bands using any modulation technique including Phase Shift Keying (PSK), Quadrature Amplitude Modulation (QAM), Ternary signals, Orthogonal Frequency Division Multiplexing (OFDM), Pulsed OFDM, multi code (for example, combining of Hadamard sequences), Pulse Position Modulation (PPM) or by selecting the band according to the information. Coding can be added to improve the performance. A difference between different sub-bands can be averaged using channel state information in a transmitter, a receiver, or both.

In embodiments using pulse systems, the pulse repetition interval can be reduced to allow for reduced sampling rates, reduced power consumption, improved inter-symbol interference (ISI) mitigation, improved energy collection and improved multiple-access.

In some embodiments, where the frequency range is divided into sub-bands, two overlapping groups of 15 sub-bands are divided, although use of less than 15 sub-bands in any specific link is possible. As FIG. 7 illustrates, Group A includes 15 Sub-bands with spacing of 470 MHz. Group B also includes 15 Sub-bands, which overlap the first group but are shifted 235 MHz aside. This method enhances system flexibility with respect to co-existence, interference mitigation and multiple-access. Each sub-band is generated by a pulse with 10 dB bandwidth of ~520 MHz.

Some embodiments provide advantages in interference and co-existing. In some embodiments, one or several bands are eliminated while detecting an in-band interferer like 802.11A. This achieves a better selectivity for out of band interference based on the fact that the bands are narrow relative to a single band system.

In some embodiments, by transmitting each symbol in a different band according to a known sequence, a better resistance to ISI is achieved. This is based on the low pulse repetition interval per sub-band.

In some embodiments, each piconet uses a different time frequency interleaving sequence. The sequence is based on a pseudo-random sequence or a pre-determined sequence. Different phases of the same sequence can also be used in synchronized or semi synchronized cases. In some embodiments, a color code can be added above the sequence to increase the number of possible sequences and piconets. FIG. 8 depicts a table 800 of time-frequency interleaving sequences, and provides an example of the use of 7 bands according to the sequence. The seed sequences of time frequency interleaving are defined in a way that when using two unsynchronized sequences in two piconets only a single collision is expected at all phases.

In some embodiments, the same seed sequence is used for lower pulse repetition intervals, reduced number of sub-bands, or transmission of sub-bands in parallel.

In some embodiments, there is an option to stay in the same frequency for more than one symbol. This improves performance and improves multiple access, allows energy collection, and simplifies the wave generator, for example, by allowing slower frequency switching.

In some embodiments, the bands can be used in a burst mode. Either a burst in a given frequency followed by an off period, or a burst of frequencies followed by an off period.

Some embodiments implement single, double or parallel chains. In many instances, a one receiver option can be the simplest solution and have the best current efficiency. Using parallel receivers with each receiver dedicated for each band enables energy collection for each band. Generally, this option requires a bigger die size and more power. Some embodiments may use two or more chains, which in some circumstances can help mitigate undesirable properties that may be present.

In some embodiments, in order to generate a rake receiver, either parallel receivers are used (e.g. work in parallel on all bands or divide the bands between them), or in the case of lower pulse repetition intervals, the same receiver is used.

Figure 9:
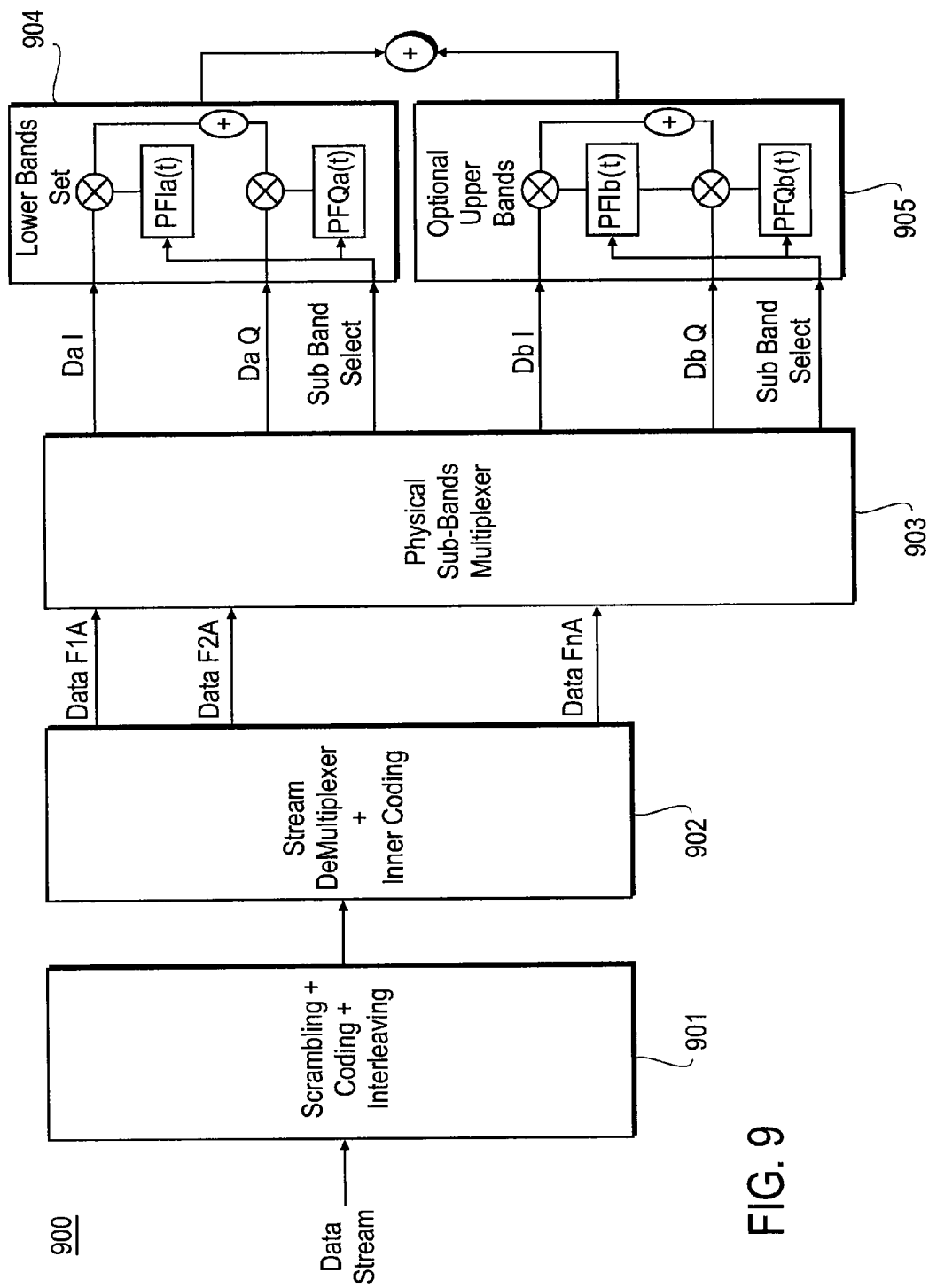
FIG. 9 is a block diagram depicting an implementation of a multi-band signal generator, according to one embodiment of the invention.

FIG. 9 is a block diagram 900 providing an illustration of a multi-band signal generator according to one embodiment of the invention. At block 901, scrambling is performed (to prevent a sequence of zeros or ones), coding is performed (to correct errors), and interleaving is performed (to eliminate burst of errors). Block 902 contains a stream demultiplexer (for example, a serial to parallel demultiplexer, where each output goes to separate sub-band), and inner coding (where there is a different code or different code rate for each band, and where some sub-bands have a different link budget according to either the frequency attenuation slope in the air or according to interference). Block 903 includes a multiplexer (for example, a parallel to serial multiplexer, with a serial output). Blocks 904 and 905 are IQ modulators where each symbol is modulated on another sub-band. The upper-bands modulator 905 is optional and may be used to transmit two symbols thereby supporting a higher bit rate.

In some embodiments of the invention, an Ultra Wide Band (UWB) system may be used to transmit high bit rate information. In some embodiments, transmitting using UWB, the data stream can or must be transformed. The following discussion provides examples of techniques for transforming data sequences to be transmitted using UWB transmission. According to various embodiments of the invention, transmission schemes can include transmitting on an entire UWB spectrum, or on sub-bands of the UWB spectrum using multi-band UWB.

Figure 10:
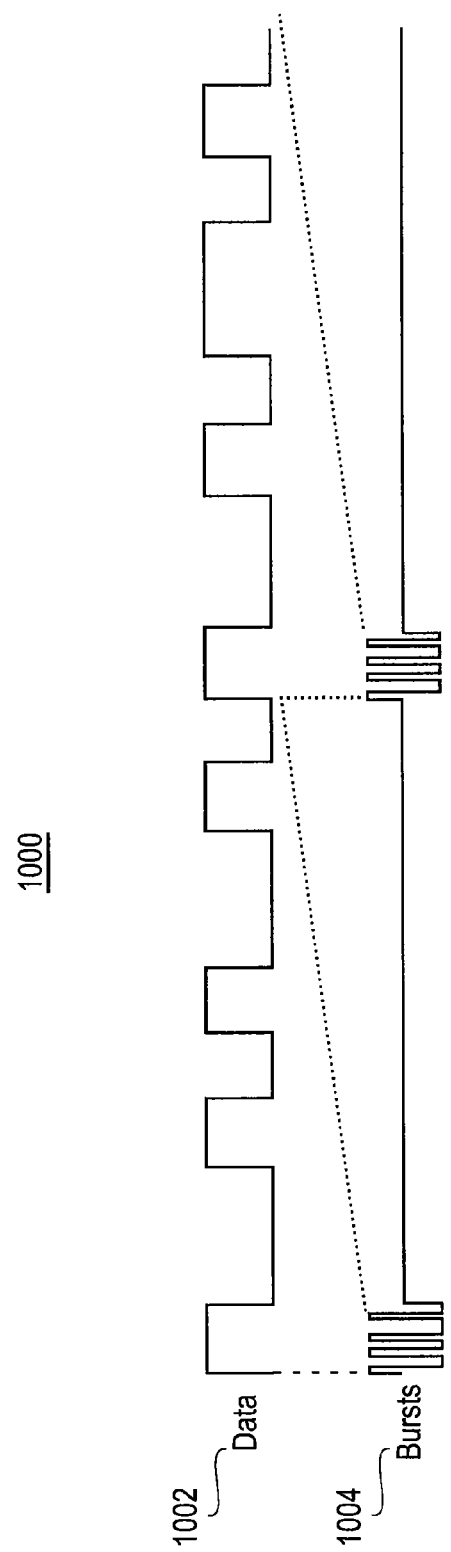
FIG. 10 is a timing diagram that depicts a burst transmission, according to one embodiment of the invention.

A transformation can be performed on a data sequence, for example, to decrease the transmission time of the original data signal to be sent. In some embodiments, the data signal is collected and sent as burst. FIG. 10 is a timing diagram 1000 showing one embodiment of such a burst scheme. In some embodiments of the invention, a few or multiple bits are collected by the transmitter and are subsequently transmitted in a burst as a fast sequence, one example of which is illustrated in FIG. 10. The data signal 1002 represents a sequence of zeroes and ones, to be transmitted over 1 microsecond. The sequence is condensed to a 10 nanosecond burst of data and a 90 nanosecond silent period. Signal 1004 represents the condensed burst transmitted signal. FIG. 10 illustrates which data bits are translated into which burst signal. In various embodiments, the transformed signal 1004 may be transmitted using one of the schemes from FIG. 20, discussed subsequently herein.

In some embodiments utilizing the aforementioned burst transmission scheme in FIG. 10, random positioning can or must be used for each transmitted sequence. Coding may not be able to adequately distinguish between users in a multiple access system because each user may use all sequences. Therefore, in some embodiments, the burst sequence is transmitted in a random position in the symbol cycle.

Figure 11:
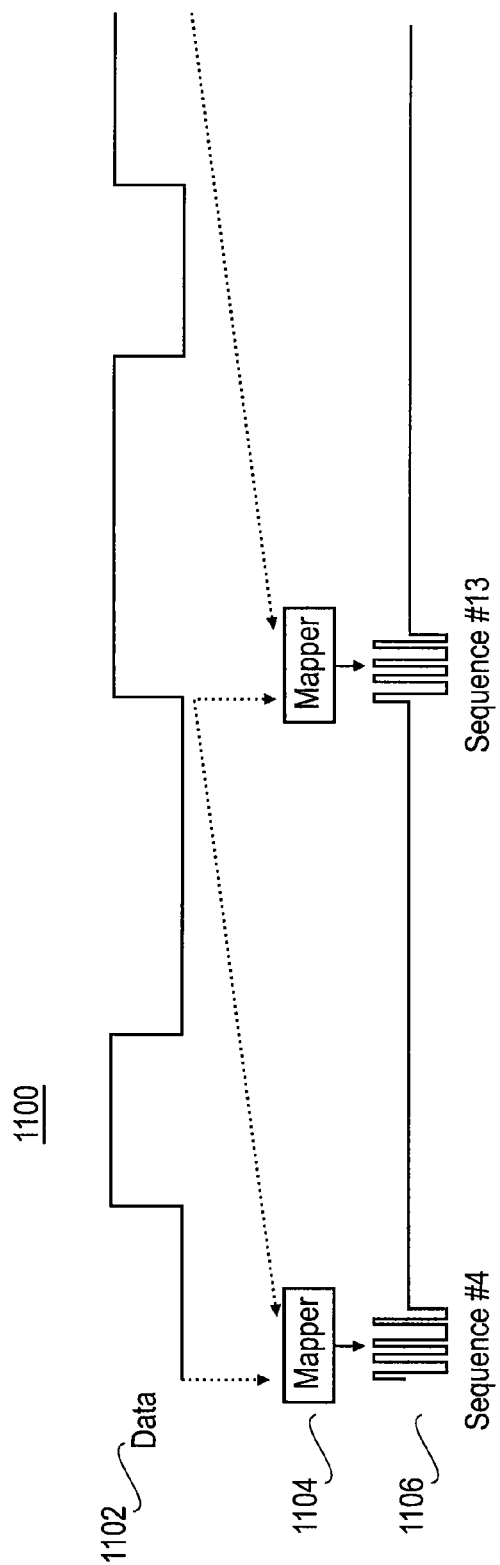
FIG. 11 is a timing diagram that depicts a symbol mapped transmission, according to one embodiment of the invention.

FIG. 11 is a timing diagram 1100 that depicts a symbol mapped transmission, according to one embodiment of the invention. As depicted in FIG. 11, the data sequence 1102 is mapped to a symbol. A few or multiple bits are collected and converted to a symbol, each symbol to be transmitted as a different sequence. In some embodiments, the data bits are converted into a longer sequence of bits that will be transmitted in a shorter period of time. One example, as depicted in FIG. 11, is to convert every 4 data bits into one of 16 different sequences. This transformation is performed by mapper 1104. For each combination of 4 data bits 1102, one symbol 1106 will be transmitted. The symbol sequence contains more bits but is transmitted in a shorter period of time. In this way, 40 MBPS with 10M Sequences Per Second can be transmitted, when the symbol is 4 bits. The sequence duty cycle can be 10 nsec on, to transmit the symbol, and 90 nsec off. In some embodiments, the transmission schemes depicted in FIG. 20, described subsequently herein, may be used.

In some embodiments, the above scheme may be used for a medium data rate transmission like 40 MBPS. With a higher bit rate like 200 MBPS, it may be necessary to map every 16 bits of the data signal to each symbol. In that case a mapping from $2^{16}$ to $2^{16}$ sequences will be a mapping of bits themselves, as in the scheme illustrated in FIG. 10. Since, referring to FIG. 11 and assuming transmission of one 10 ns burst for every 100 ns, with a bit rate of 40 Mbps 4 bits are mapped to a symbol. Similarly, with a rate of 200 Mbps, 20 bits are mapped to a symbol. There is therefore, in that case, a need for a minimum of 20 chips per symbol. The mechanism depicted in FIG. 10 does not need the mapping coding gain, which is needed in the slower bit rates.

In some embodiments, the encoded sequences should generally be selected with a maximal distance between the different codes. For example, Walsh-Hadamard orthogonal sequences can be used. Alternatively, other sequences like PN sequences, Barker sequences, Gold sequences or Kasami sequences may be used.

Figure 12:
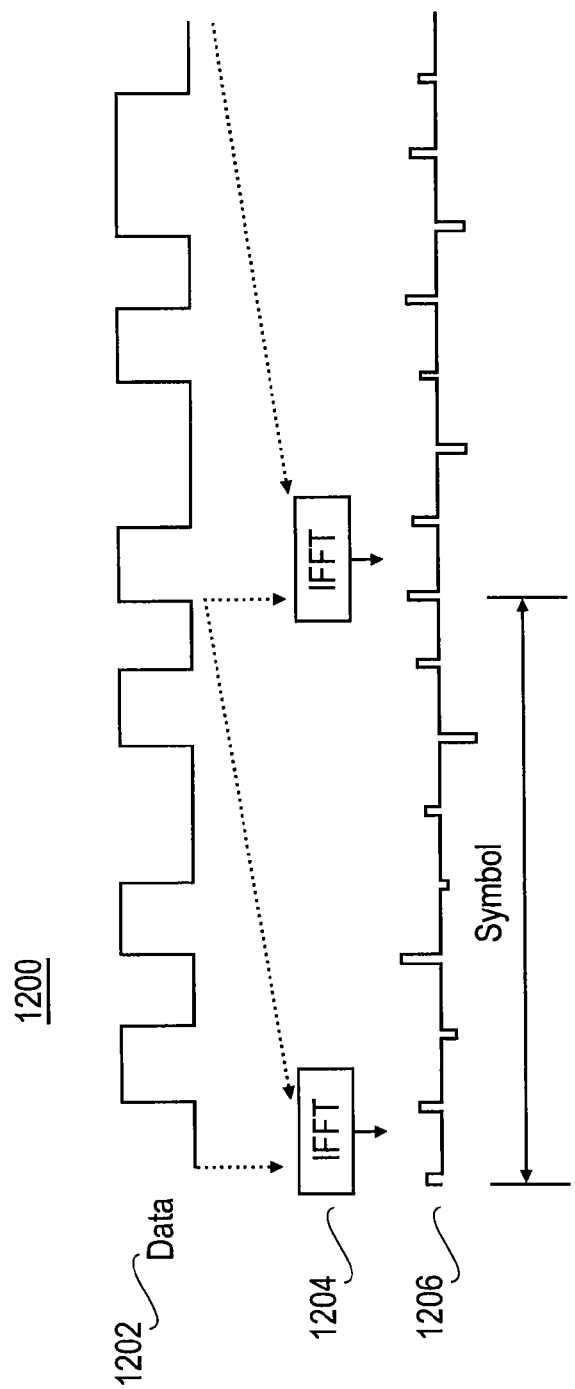
FIG. 12 is a timing diagram that depicts a pulsed OFDM transmission, according to one embodiment of the invention.
Figure 13:
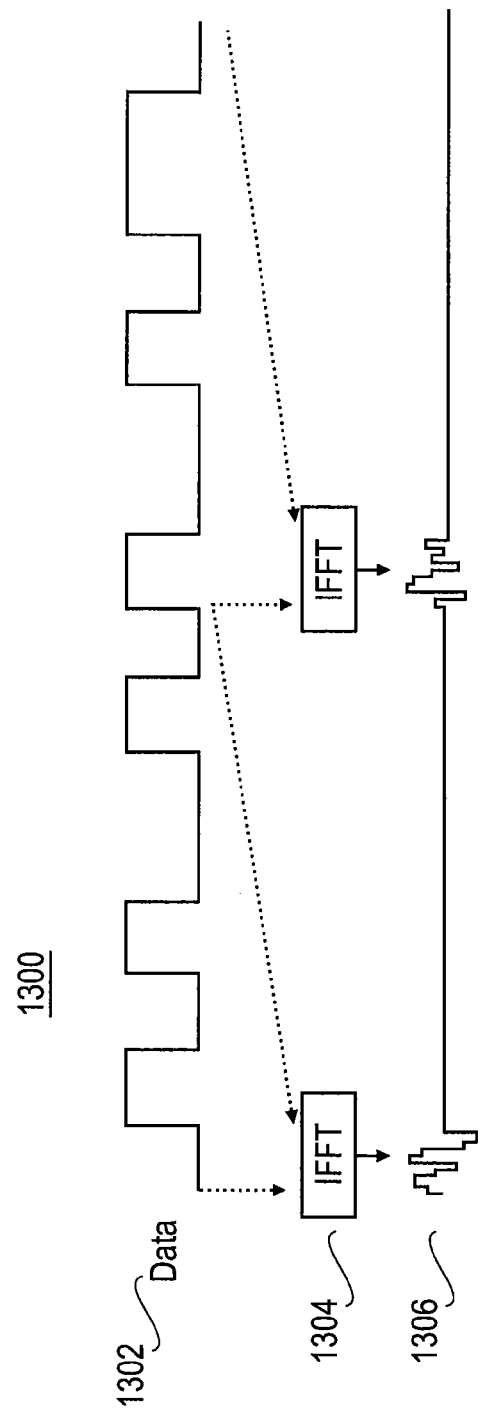
FIG. 13 is a timing diagram that depicts a burst OFDM transmission, according to one embodiment of the invention.

Multi-band transmission schemes can include pulsed or burst OFDM transmission. FIG. 12 is a timing diagram 1200 that depicts a pulsed OFDM transmission, and FIG. 13 is a timing diagram 1300 that depicts a burst OFDM transmission. In some embodiments, such as illustrated in FIGS. 12 and 13, the transformation of the data sequence is based on the Inverse Fast Fourier Transform (IFFT) in the transmitter and the Fast Fourier Transform FFT in the receiver, similar to orthogonal frequency division multiplexing (OFDM) transmission. This technique can be essentially a digital version of OFDM using orthogonal sequences, in which case a multi-level signal can be transmitted by bursting or pulsing a narrow band digital signal.

Using the multi-band UWB scheme such as described above, a pulsed or a burst OFDM signal can be transmitted over the UWB range. In some embodiments, the band in use can be changed after one pulsed OFDM symbol has been transmitted. Alternatively, the band in use can be changed after several OFDM symbols have been transmitted.

In some embodiments, discontinuous, or burst symbol cycle, transmitting is used. One advantage of using burst symbol cycle transmission is that the Fast Fourier Transform (FFT) rate using burst symbol cycle transmission is lower than the FFT rate in a continuous OFDM system.

In one embodiment of the invention, a train of OFDM pulses is transmitted, as depicted in FIG. 12. In the depicted scheme, a pulse-train is transmitted on one sub-band before switching to the next sub-band according to the time frequency sequence. This technique uses a narrow band OFDM signal generator. The original data sequence 1202 is transformed into a sequence of pulses 1206 using the IFFT 1204. In the pulsed scheme, the transmission of the pulses takes the length of the symbol time 1208. The relatively narrow OFDM signal is widened by pulsing the signal.

In FIG. 13, an embodiment utilizing a burst OFDM scheme is shown. In some embodiments, at each sub-band a burst of OFDM pulses is transmitted, as depicted in FIG. 13.

In the depicted scheme a burst is transmitted on one sub-band before switching to the next sub-band according to the time frequency sequence. This technique can use a narrow band OFDM signal generator. The narrow OFDM signal is widened by bursting. The original data bits 1302 are transformed using the IFFT 1304 and transmitted as a burst 1306. The transmission as depicted in FIG. 13 generally is faster than that depicted FIG. 12 and takes a fraction of the symbol time. In some embodiments, the transmission schemes of FIG. 20 may be used.

Figure 14:
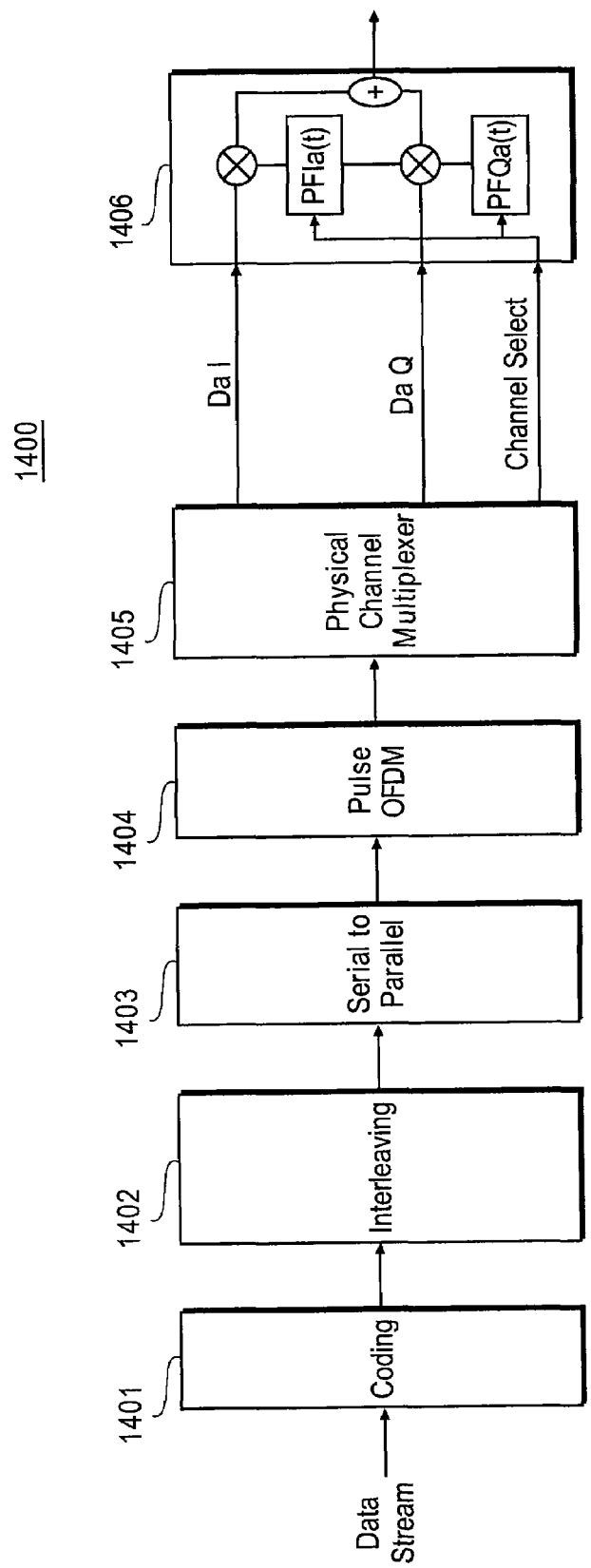
FIG. 14 is a block diagram depicting an implementation of a multi-pulsed OFDM, according to one embodiment of the invention.

FIG. 14 is a block diagram depicting an implementation of multi-band pulsed OFDM. Transmitting pulsed OFDM in each sub-band of a UWB system, as depicted, can allow the system to stay in the same frequency for longer periods of time while being able to cope with ISI problems. Coding is performed by 1401. After the interleaving 1402, there is a serial to parallel converter 1403, which generates a parallel word for the pulse OFDM generator 1404. The serial to parallel converter 1403 generates the symbols used in FIG. 12 (each symbol is going to be transmitted on a different band). The channel multiplexer 1405 takes the symbols and converts it back to a serial stream and passes it to the QPSK modulator 1406.

Schemes such as that depicted in FIG. 14 generally can provide certain benefits, such as the following: slower band change rate, or simpler wave generation; improved channelization under interference associated with multi-path characteristics; improved energy collection; and better resistance to ISI based on the OFDM. Generally, some of the tradeoffs of schemes such as depicted in FIG. 14 can include the fact that implementation is generally more complex, and peak-to-average increased, relative to other multi-band systems.

Figure 15:
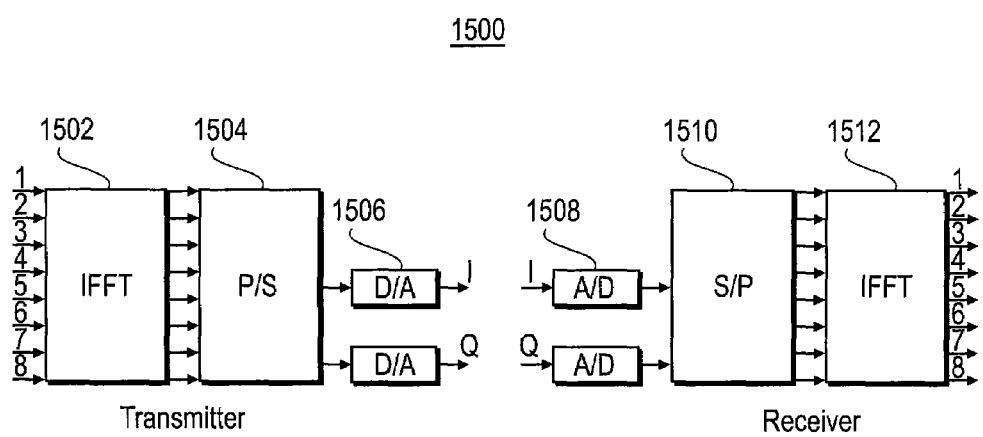
FIG. 15 is a block diagram depicting one implementation of an OFDM transmitter and receiver mechanism, according to one embodiment of the invention.

FIG. 15 is a block diagram 1500 depicting one implementation of a burst OFDM transmitter and receiver mechanism. A few bits are collected. Each bit can be +1 or −1. The bits are converted as if they were a frequency spectrum into digital values using IFFT 1502. The signal is converted using a parallel to serial (P/S) converter 1504 and a digital to analog (D/A) converter 1506. The bursts are transmitted using analog values, instead of digital as in some previously discussed embodiments. The transmitter can use binary phase key shifting (BPSK) or quaternary phase key shifting (QPSK) modulation. On the receiving side, the signal is converted using an analog to digital converter (A/D) 1508 then by a serial to parallel (S/P) converter 1510 and by a FFT 1512.

Figure 16:
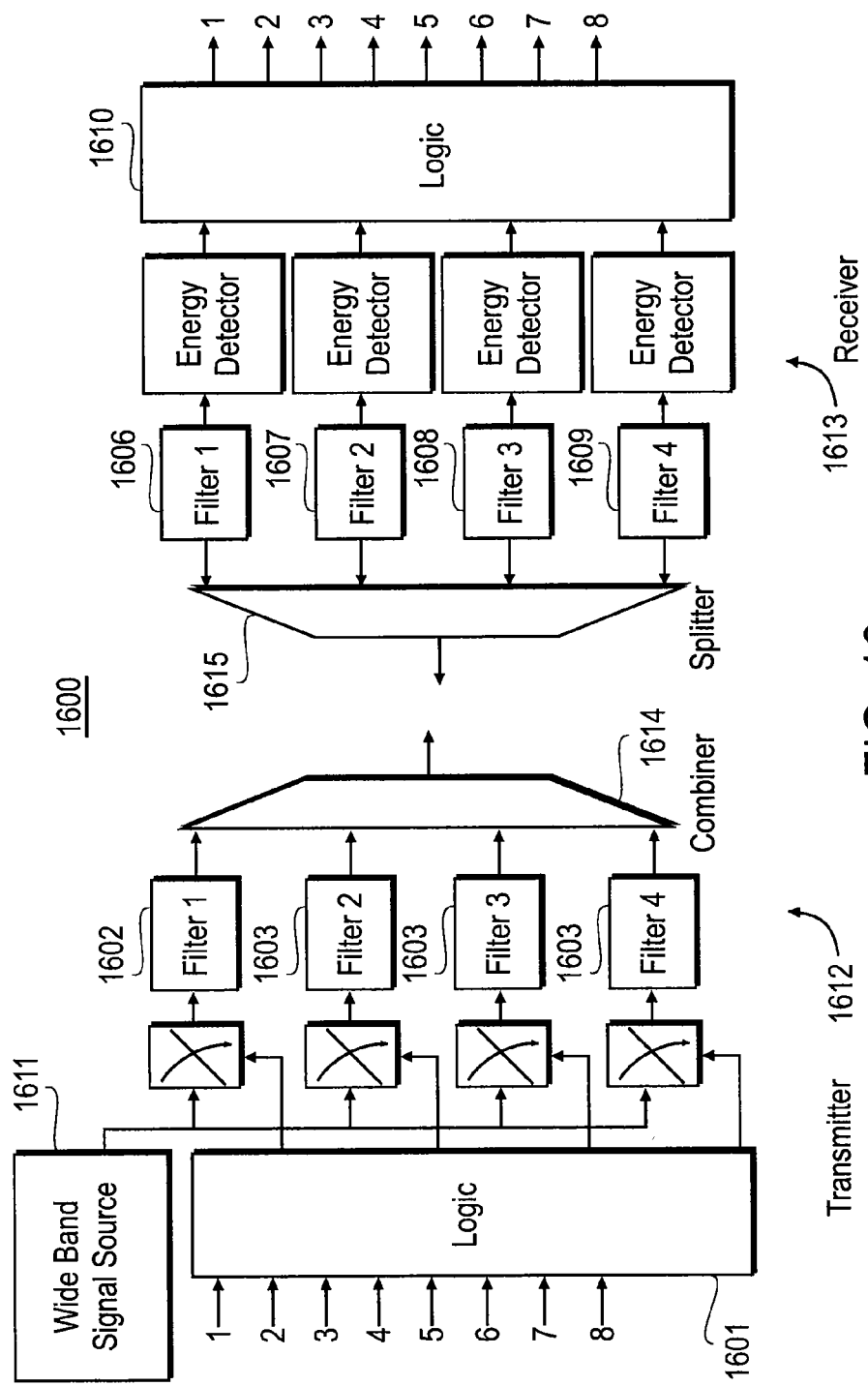
FIG. 16 is a block diagram depicting an OFDM transmitter and receiver mechanism, according to one embodiment of the invention.

FIG. 16 is a block diagram 1600 depicting an OFDM transmitter and receiver mechanism, according to one embodiment of the invention. Some embodiments, as shown in FIG. 16, use what can be a simpler implementation of an OFDM transmitter. A portion of the frequencies is used with a minimal distance between them. A sequence of filters is used in the transmitter and receiver instead of IFFT and FFT. A non-coherent receiver is implemented using energy detectors. The wide band signal generator on the transmitter 1610 side includes a source 1611, which generates a signal over the entire UWB spectrum. Each filter 1602 through 1605 is filtering a specific band. Therefore, whenever the wide band signal exists at the filter input, that specific band exists on the combiner 1614 input. The logic controls a sequence of switches in a manner such that every combination of the bands can be in the air at every moment. The receiver 1613 includes filters 1606 through 1609 and detectors, which can detect, in a non-coherent way, the existence of each band at every moment. This is an implementation of an OFDM transmitter, where parts of the frequencies are used with minimal distance between them (these are the sub-bands).

Figure 17:
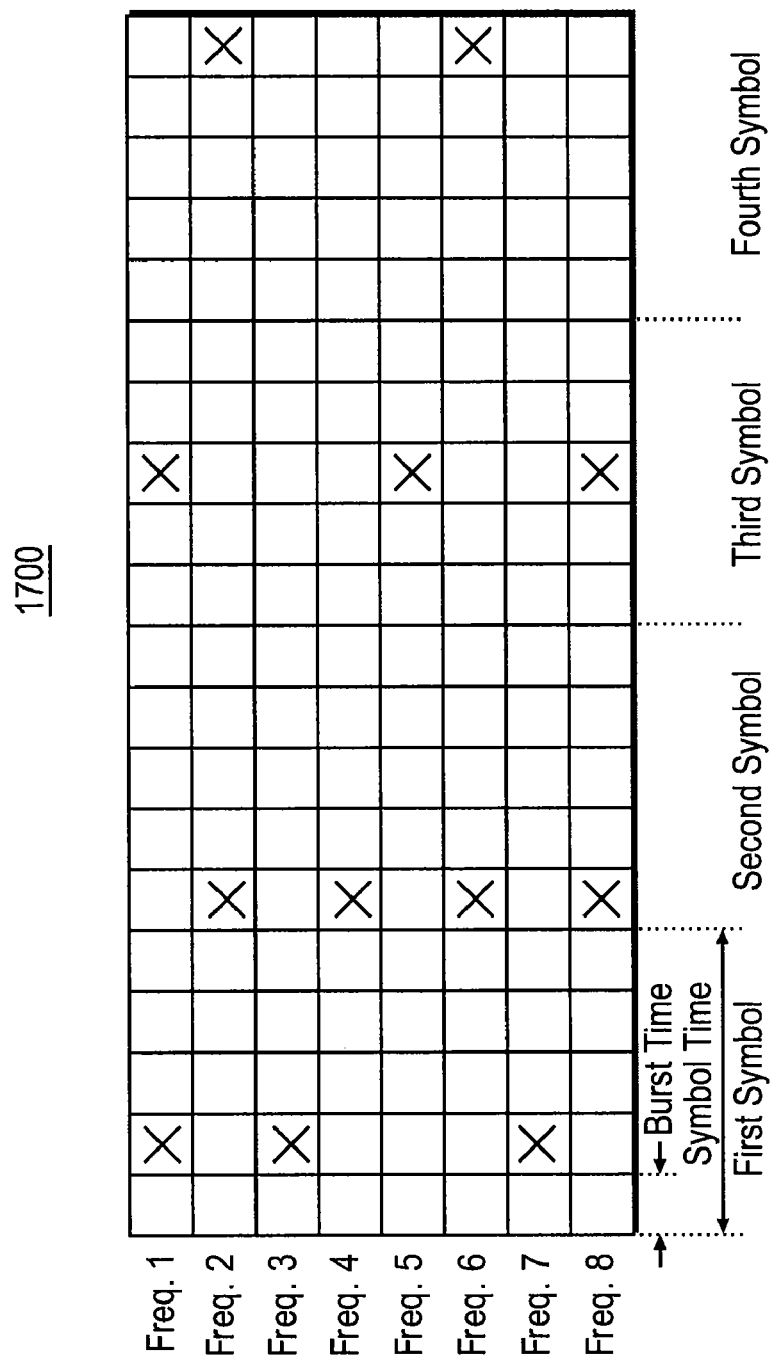
FIG. 17 is a chart depicting a frequency selection option implementation, according to one embodiment of the invention.

FIG. 17 is a chart 1700 depicting a frequency selection option implementation according to one embodiment of the invention. In some embodiments, as FIG. 17 illustrates, the implementation has a frequency selection option in addition to different burst positions. Using two planes as depicted in FIG. 17, either part of the information in plane A and part in plane B is transmitted, or the same information in both planes is transmitted. By doing so, the system generally can achieve a gain in diversity, i.e., resistance for both constant frequency interference and periodic time interference.

During each symbol time, a few or multiple frequencies can be transmitted, according to the OFDM mapping, in a different position but according to the same information, for the diversity, or according to additional bits for providing a higher bit rate.

The implementation depicted in FIG. 17 provides an example of transmitting in two planes. In the example depicted, the burst time is 20% of the symbol time, and therefore there are 5 positions for the burst in each symbol period. In each symbol, a pattern of frequencies is transmitted in a different position In some embodiments, a Quaternary Phase Shift Keying (QPSK) mixer can be used in the transmitter and in the receiver in order to multiply the maximum bit-rate by 2.

Figure 18:
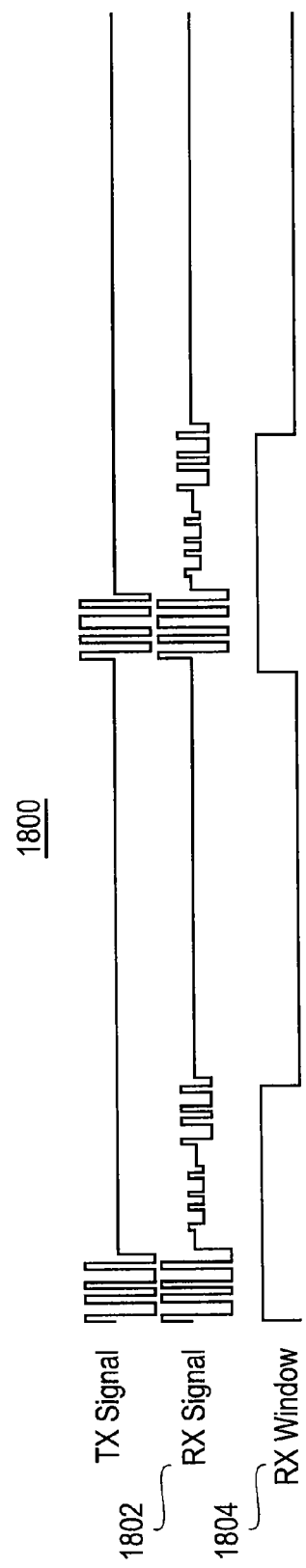
FIG. 18 is a timing diagram depicting an elongated sample window implementation, according to one embodiment of the invention.

FIG. 18 is a timing diagram 1800 depicting an elongated sample window implementation. In some embodiments, such as illustrated in FIG. 18, at the receiver, the input 1802 will be sampled with a longer window in time 1804. This allows for collection of the multipath and allows for implementation of a Rake receiver and equalizing of the channel.

In certain embodiments where the actual sample rate is around 1 GHz, for example, when using the FFT, the system can comprehend the entire spectrum, and can cancel interference by receiving the signal with notch on the interference.

In some embodiments, a way to allow multiple access with all the options is by using a random burst position.

The aforementioned signals may, in some embodiments, be transmitted using multi-band UWB. In some embodiments, every waveform may be transmitted on a different band. Herein, the term "waveform" is used to refer to a signal including its associated waveform characteristics. Additionally, in some embodiments, several waveforms may be transmitted on the same band. Furthermore, in some embodiments, all the transmissions may occur on the same band.

For example, in an embodiment using burst OFDM, the signal may be transmitted in multiple ways. The transmission mechanisms include transmitting every burst signal on a different band, transmitting several bursts on the same band, or sending all bursts on the same band. Similarly, in an embodiment utilizing pulsed OFDM, the signal may be transmitted in multiple ways. The transmission mechanisms include transmitting every symbol or train of pulses on a different band, transmitting multiple symbols or trains of pulses on the same band, or transmitting all symbols or trains of pulses on the same band.

Variations on transmission techniques are possible in various embodiments of the invention. For example, the jumping sequence may be short while in other embodiments it may be long. Also, the length of the jumping sequence may depend on, or may not depend on, the information. Additionally, the bands can be separate, can overlap, or can partially overlap. Furthermore the wave generator can be analog with a few carriers, or can include one carrier with frequency dividers. Alternatively, the wave generator may be digital with, for example, a two or three level digital signal. Furthermore, the frequencies may have a constant phase relation whereby they lock on the same reference, or the frequencies may not have a constant phase relation. Additionally, in some embodiments a few bands can be used in parallel, where each band contains different information. In other embodiments, the same information may be transmitted on multiple bands.

Various embodiments of the invention as described herein can provide many advantages compared to known alternatives. These advantages can include one or more of the following, among others: the ability to better deal with interference, less inter-symbol interference (ISI), better channel energy collection, better spectral shaping, and fast synchronization. In addition, some embodiments of the invention provide a solution for multiple access. In some embodiments, provides a tradeoff capability between better peak to average ratio (P/A) and higher bit-rate.

Figure 19:
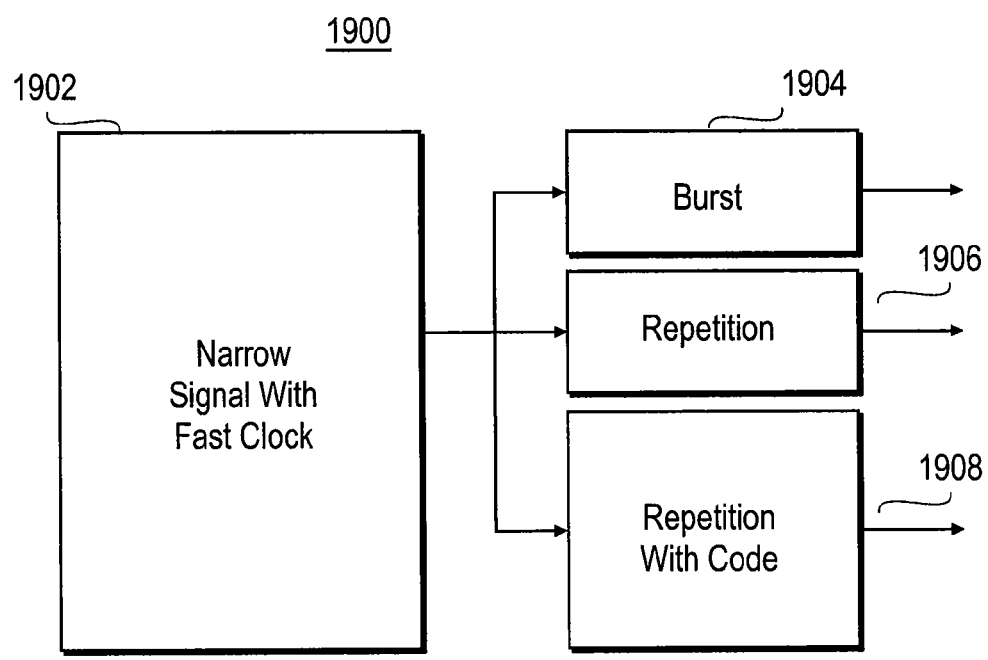
FIG. 19 is a block diagram depicting an implementation of multiple transmission schemes, according to one embodiment of the invention.
Figure 20:
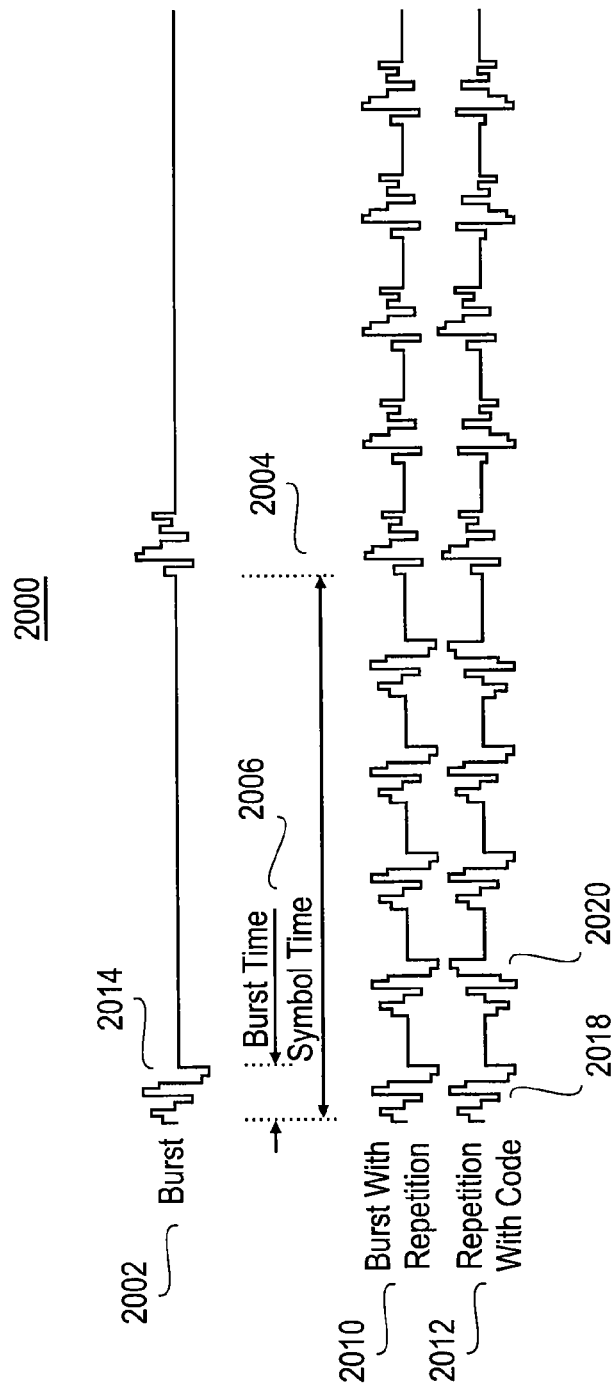
FIG. 20 is a timing diagram depicting multiple transmission schemes, according to one embodiment of the invention.

FIGS. 19 and 20 provide illustrations of three ways in which information can be transmitted. These transmission mechanisms can be used in embodiments of the multi-band UWB transmission schemes described above.

FIG. 19 is a block diagram 1900 depicting an implementation of multiple transmission schemes, which can be used exclusively or in some combination. As shown in FIG. 19, according to some embodiments of the invention, transmission can be accomplished in one of three ways. A narrow signal with a fast clock 1902 can be transmitted using one of the three mechanisms illustrated in the FIG. 19. In some embodiments, regular burst transmission 1904 is used. In other embodiments, the repeated burst transmissions 1906 within the symbol time are used to transmit information, which can provide an improved to the P/A ratio. In other embodiments, transmissions may be performed by repetitions, with codes in each repetition, or repetition with code 1908, which can improve the spectral shaping of the signal and provide additional separation for multiple access.

FIG. 20 shows a timing diagram 2000 of the three possible transmission mechanisms In some embodiments, the signal may be sent as a burst 2002, where the information 2014 is sent in beginning of the symbol time 2004. The burst transmission takes one burst period, or burst time 2006, to transmit, and the remainder of the symbol time 2004 is silent. In other embodiments, the signal 2016 is transmitted with repetitions 2010. During one symbol time 2004, the information 2016 is repeatedly sent. In other embodiments, the information 2018 is burst repeatedly 2012 with a code 2020 following each transmission.

Costas loop tracking can be used for phase tracking. A Costas loop generally includes using two correlators with 90 degree separation between the locals (I and Q), multiplying I and Q, and, after using a loop filter to control the clock, tracking the carrier signal. Because the receiver utilizes a single clock, this tracking also maintains the sequence phase. When the information packet ends, the receiver assumes state 1 1202. It is to be noted that a Costas loop tracking system can also be used in carrierless embodiments of the invention.

As described in more detail in previously incorporated by reference U.S. application Ser. No. 10/389,789, the methods and systems according to various embodiments of the invention can provide numerous advantages over known wireless transmission systems, including, among others, reduced power usage, reduced interference, better multipath fading resistance, lower peak power usage, and more desirable peak to average ratios, the use of a simplified and less accurate filter for ISI limitation and the use of a less accurate switch timing for a given specific performance.

What is claimed is:

1. A method for communicating information, comprising: allocating, for signal transmission, each of a plurality of frequency sub-bands of an ultra-wide band spectrum; sending an ultra-wide band transmission comprising the information over the ultra-wide band spectrum, comprising sending a signal over each of the plurality of sub-bands; and receiving the ultra-wide band transmission comprising the information over the ultra-wide band spectrum, comprising receiving the signals, wherein sending the ultra-wide band signal comprises: converting a first data signal containing information into one or more encoded signals using an Inverse Fast Fourier Transform; and converting the encoded signal into an encoded ultra-wide band signal comprising burst symbol cycles.

2. The method of claim 1, wherein sending the signals comprises sending a different waveform over each sub-band.

3. The method of claim 1, wherein sending the signals comprises sending more than one waveform over a single sub-band at a given time.

4. The method of claim 1, wherein sending the ultra-wide band signal comprises transmitting over only a single one of the sub-bands at a given time.

5. The method of claim 1 wherein sending the ultra-wide band signal comprises switching between sub-bands.

6. The method of claim 5, wherein the switching is performed after each symbol is transmitted.

7. The method of claim 5, wherein the switching is performed after several symbols are transmitted.

8. The method of claim 5, wherein the switching is performed after one or more symbols are transmitted and an OFF period.

9. The method of claim 8, wherein the OFF period is used to reduce power consumption in the receiver and transmitter.

10. The method of claim 1, wherein the narrowband signal comprises an OFDM signal with a cyclic prefix.

11. The method of claim 1, wherein the narrowband signal comprises an OFDM signal with a gap and/or cyclic prefix.

12. The method of claim 1, comprising performing energy collecting and/or inter carrier interference mitigation by at least one of using parallel receivers, providing a gap between the OFDM symbols, cyclic prefix and using the tail of the symbol generated by multi-path in the channel.

13. A method for communicating information, the method comprising: allocating, for signal transmission, each of a plurality of frequency sub-bands of an ultra-wide band spectrum; sending an ultra-wide band transmission comprising the information over the ultra-wide band spectrum, comprising sending a signal over each of the plurality of sub-bands; and receiving the ultra-wide band transmission comprising the information over the ultra-wide band spectrum, comprising receiving the signals, wherein sending the ultra-wide band signal comprises: convening a first data signal containing information into one or more encoded signals using an Inverse Fast Fourier Transform; and convening the encoded signal into an encoded pulsed ultra-wide band signal.

14. The method of claim 13, wherein sending the signals comprises sending a different waveform over each sub-band.

15. The method of claim 13 wherein sending the signals comprises sending more than one waveform over a single sub-band at a given time.

16. The method of claim 13, wherein sending the ultra-wide band signal comprises transmitting over only a single one of the sub-bands at a given time.

17. The method of claim 13 wherein sending the ultra-wide band signal comprises switching between sub-bands in which pulses are transmitted.

18. The method of claim 17, wherein the switching is performed after each symbol is transmitted.

19. The method of claim 17, wherein the switching is performed after several symbols are transmitted.

20. The method of claim 17, wherein the switching is performed after one or more symbols are transmitted and an OFF period.

21. The method of claim 20, wherein the OFF period is used to reduce power consumption in the receiver and transmitter.

22. The method of claim 13, wherein the narrowband signal comprises an OFDM signal with a cyclic prefix.

23. The method of claim 13, wherein the narrowband signal comprises an OFDM signal with a gap and/or cyclic prefix.

24. The method of claim 13, comprising performing energy collecting and/or inter carrier interference mitigation by at least one of using parallel receivers, providing a gap between the OFDM symbols, cyclic prefix and using the tail of the symbol generated by multi-path in the channel.

25. The method of claim 13, comprising determining a bandwidth of each of a plurality of bands used by the second signal by a narrow pulse width.

* * * * *